(12) United States Patent
Dasgupta

(10) Patent No.: US 12,061,468 B2
(45) Date of Patent: Aug. 13, 2024

(54) EMERGENCY RESPONSE MANAGEMENT APPARATUSES, METHODS AND SYSTEMS

(76) Inventor: Gautam Dasgupta, Briarcliff Manor, NY (US)

( * ) Notice: Subject to any disclaimer, the term of this patent is extended or adjusted under 35 U.S.C. 154(b) by 674 days.

(21) Appl. No.: 13/310,547

(22) Filed: Dec. 2, 2011

(65) Prior Publication Data

US 2012/0179421 A1 Jul. 12, 2012

Related U.S. Application Data

(60) Provisional application No. 61/420,605, filed on Dec. 7, 2010.

(51) Int. Cl.
*G06F 17/18* (2006.01)
*G05B 23/02* (2006.01)

(52) U.S. Cl.
CPC .............................. *G05B 23/0281* (2013.01)

(58) Field of Classification Search
CPC ... G05B 23/0281; G01W 1/00; G06F 2218/10
USPC .......... 705/181; 702/19, 3, 189, 181; 703/11
See application file for complete search history.

(56) References Cited

U.S. PATENT DOCUMENTS

| | | | |
|---|---|---|---|
| 6,914,525 B2 * | 7/2005 | Rao et al. | |
| 7,825,791 B2 * | 11/2010 | Kim et al. | |
| 2004/0215551 A1 * | 10/2004 | Eder | G06Q 40/00 705/38 |
| 2005/0033678 A1 * | 2/2005 | Huneault | |
| 2005/0128069 A1 * | 6/2005 | Skatter | G01V 5/0008 340/522 |
| 2005/0131318 A1 * | 6/2005 | Peifer | G16H 20/30 600/592 |
| 2007/0168155 A1 * | 7/2007 | Ravela et al. | |
| 2007/0213599 A1 * | 9/2007 | Siejko | A61N 1/36514 128/920 |
| 2008/0243917 A1 * | 10/2008 | Schneider | G06Q 40/08 |
| 2008/0270213 A1 * | 10/2008 | Christodoulou | G06Q 10/06 705/7.28 |

(Continued)

OTHER PUBLICATIONS

Kuo et al., LNG Tank Sloshing Assessment Methodology—The New Generation, Dec. 2009, International Journal of Offshore and Polar Engineering, vol. 19, No. 4, pp. 241-253 (Year: 2009).*

(Continued)

*Primary Examiner* — Jeffrey P Aiello
(74) *Attorney, Agent, or Firm* — Intelletek Law Group, PLLC; Gabriel Daniel, Esq.

(57) ABSTRACT

The EMERGENCY RESPONSE MANAGEMENT APPARATUSES, METHODS AND SYSTEMS ("ERMS") transform emergency related inputs and sensor information into a threat indication category, which is distributed to individuals and/or first responders for managing the threat. In one implementation, the method includes an emergency management processor-implemented method that receives sensor readings from one or more sensor devices and generates risk factors for the at least one sensor device. The generated risk factors are then curve fitted to a plurality of statistical distribution curves including both non-extreme and extreme statistical distributions, wherein each of the statistical distribution curves is indicative of a threat category. The threat category is then determined based on the generated risk factors that provide a best fit with one of the plurality of statistical distribution curves.

27 Claims, 19 Drawing Sheets

Example: ERMS Concept

(56) References Cited

U.S. PATENT DOCUMENTS

2010/0052891 A1* 3/2010 Chainer et al.
2010/0201480 A1* 8/2010 Falk .................... G05B 19/042
340/5.8
2010/0205042 A1* 8/2010 Mun
2012/0072088 A1* 3/2012 Cutright ................ B60T 17/228
701/70
2012/0123822 A1* 5/2012 Hnatio

OTHER PUBLICATIONS

PCT International Search Report and Written Opinion mailed Mar. 29, 2012 for corresponding application PCT/US2011/063156.

* cited by examiner

Example: ERMS Concept

Example: ERMS Architecture

Example: ERMS

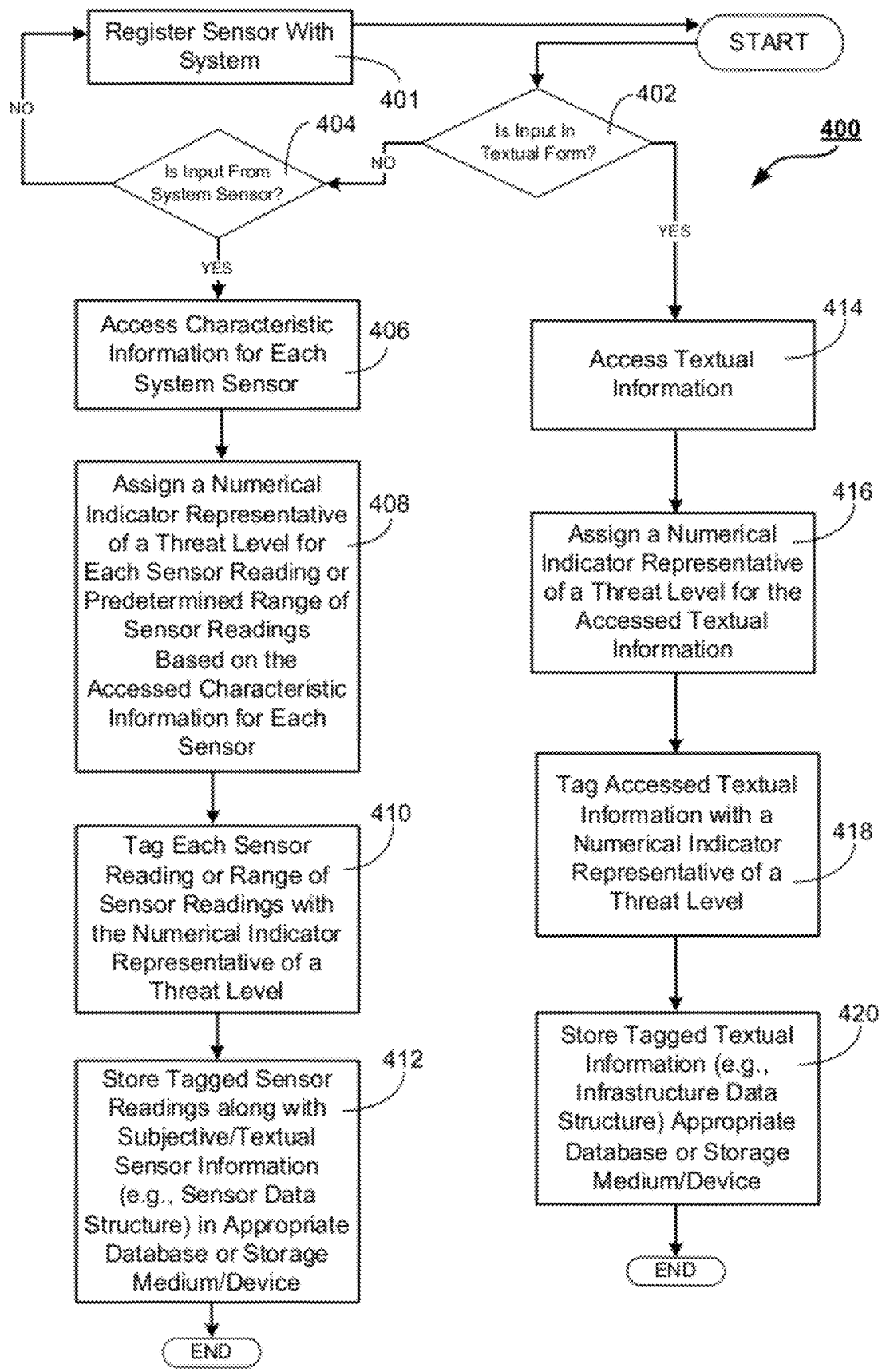
Figure 4 — Example: Threat Index Tagging Component

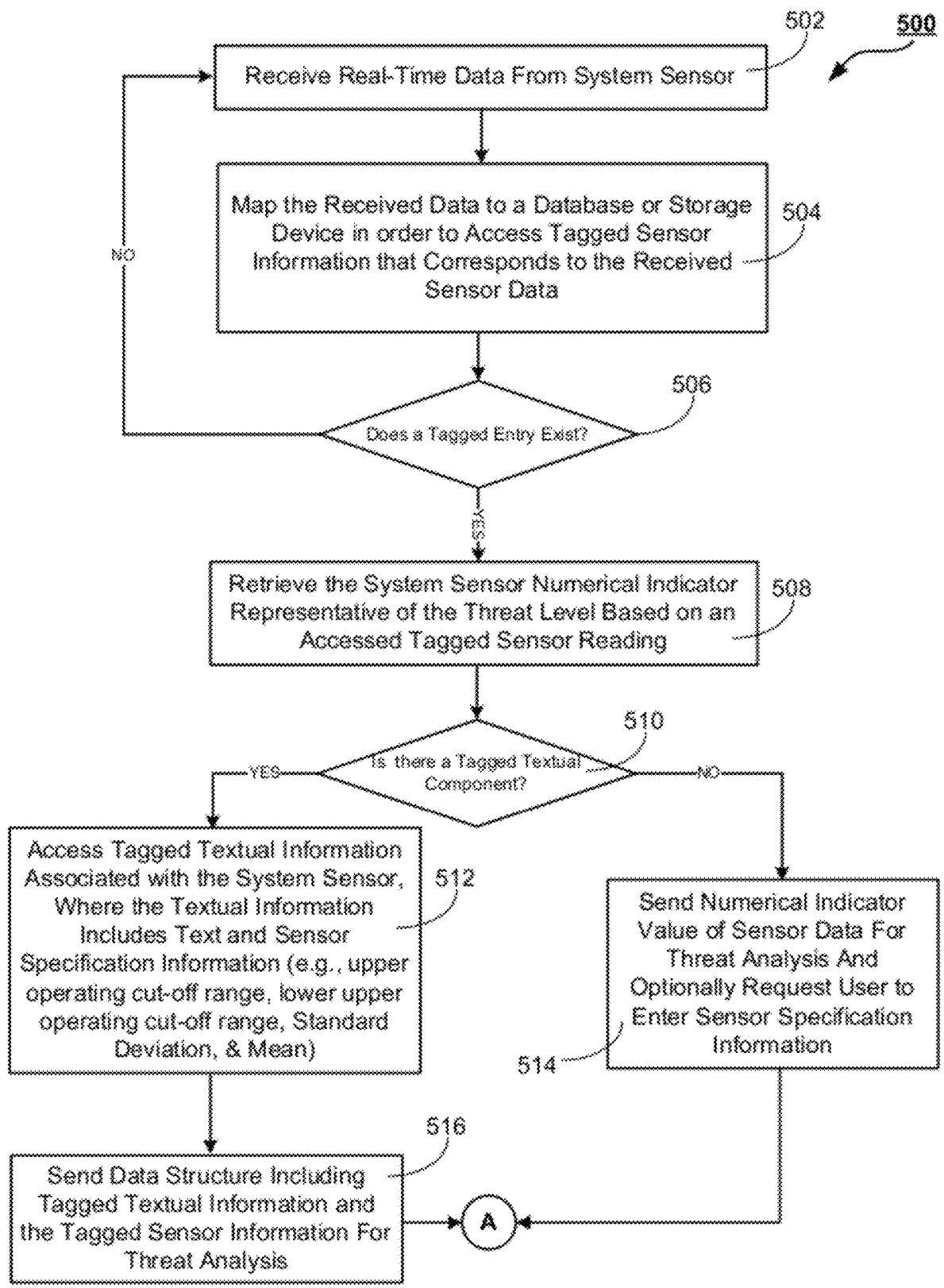
Figure 5 — Example: Threat Index Retrieving Component

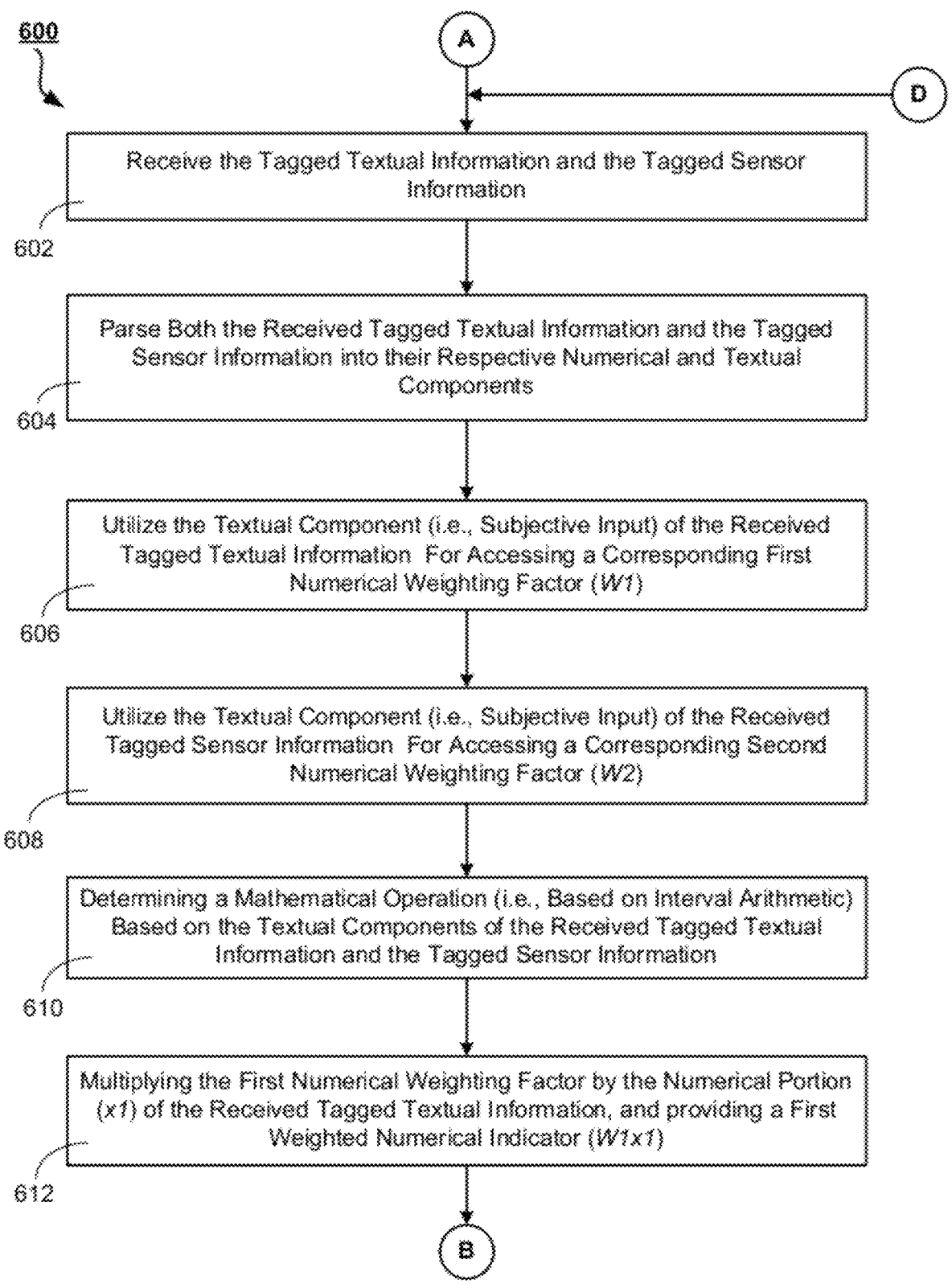
Figure 6A  Example: Event Analyzer Component

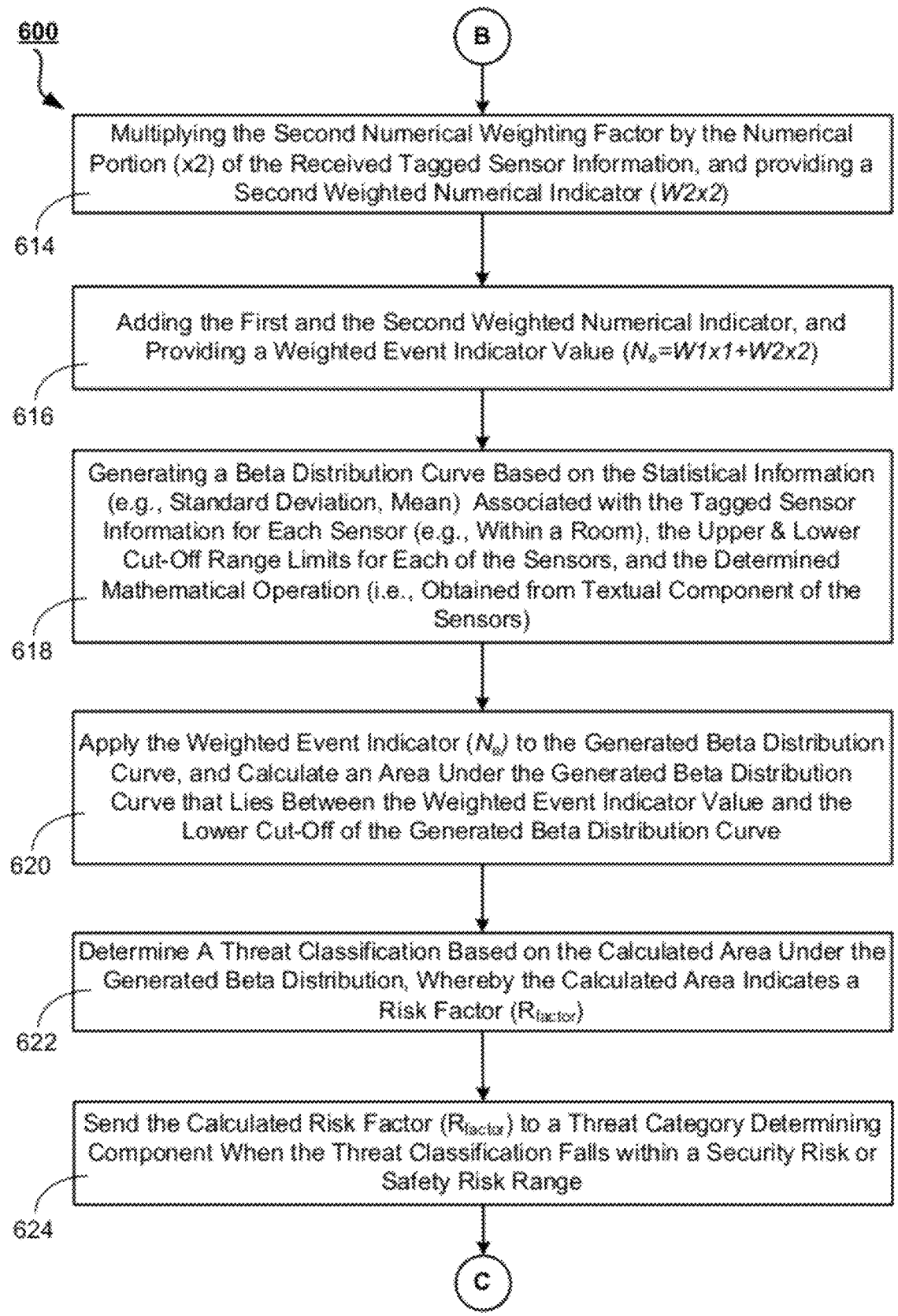
Figure 6B      Example: Event Analyzer Component

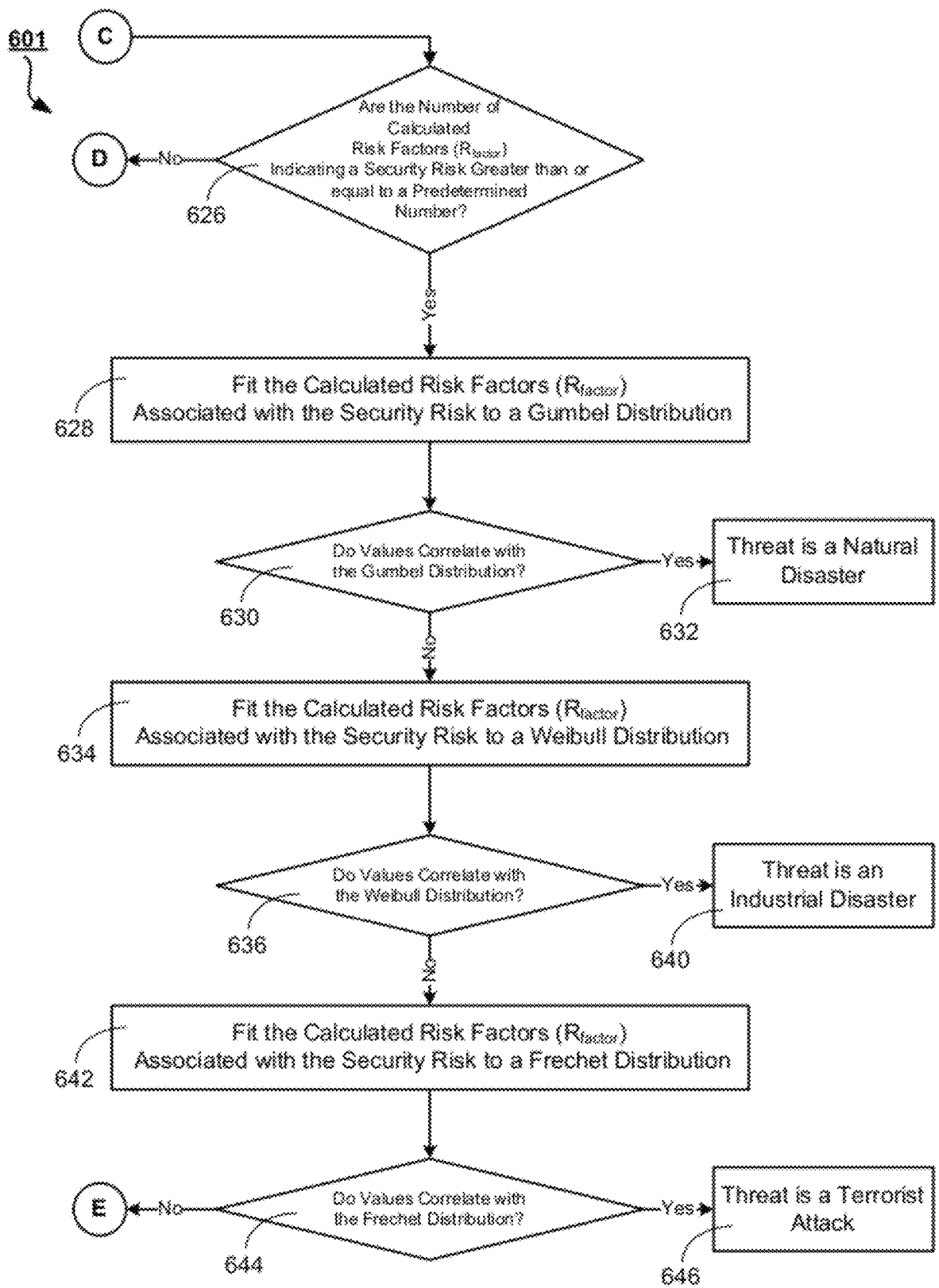
Figure 6C    Example: Threat Category Determining Component

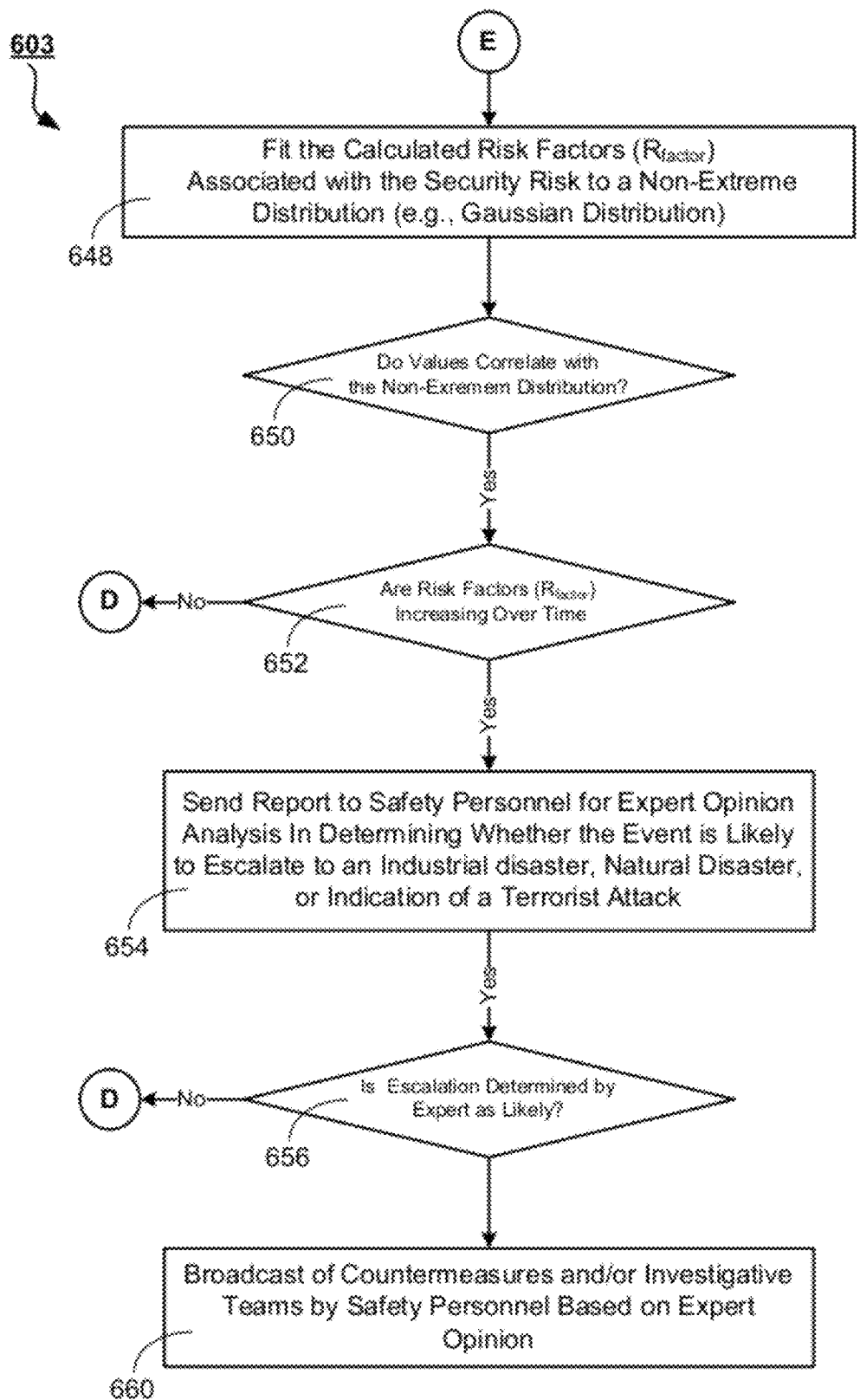
Figure 6D — Example: Early Warning Component

Example: Tagged Information in Data Structure

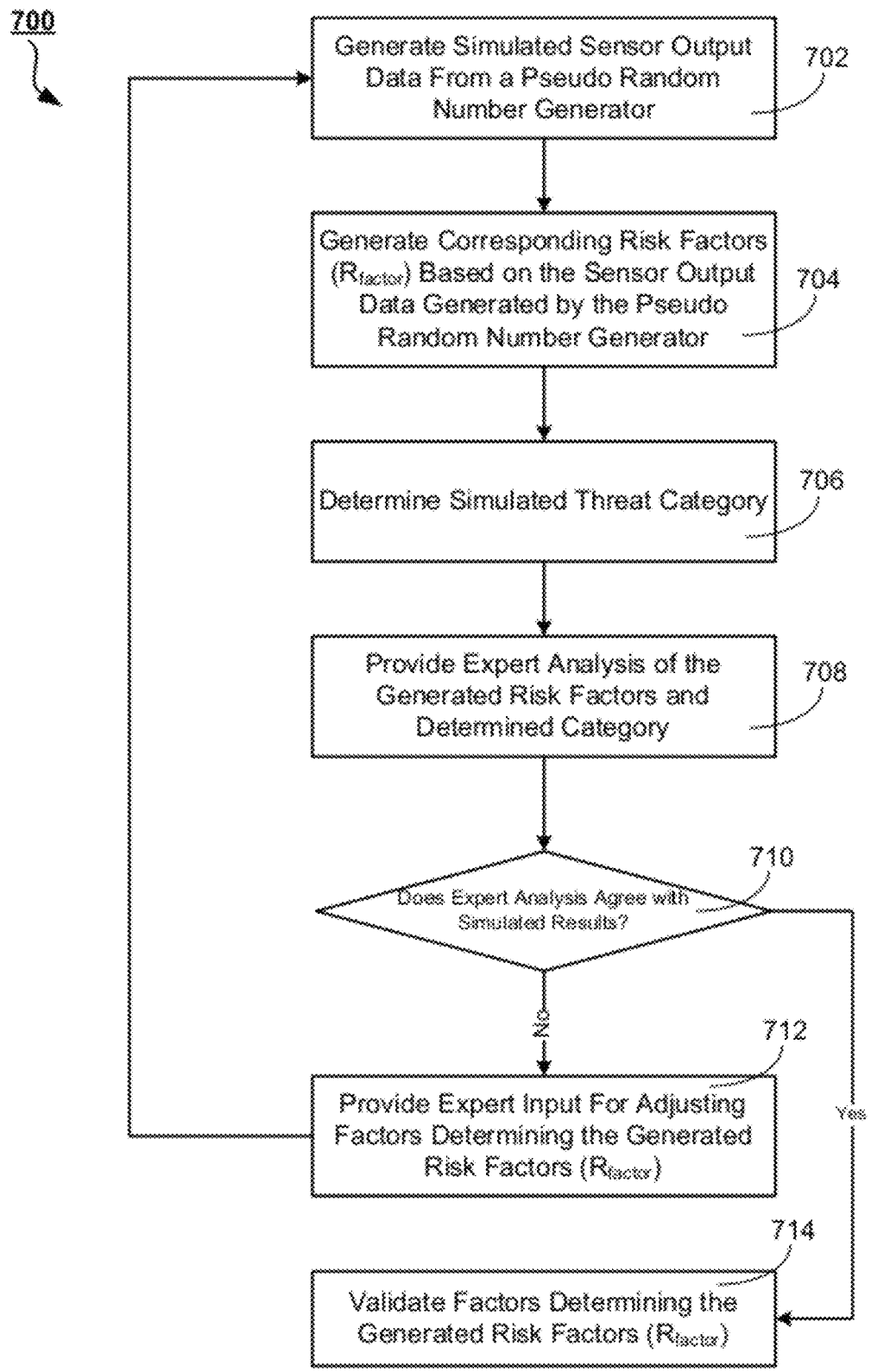
Figure 7  Example: Threat Simulation/Learning Component

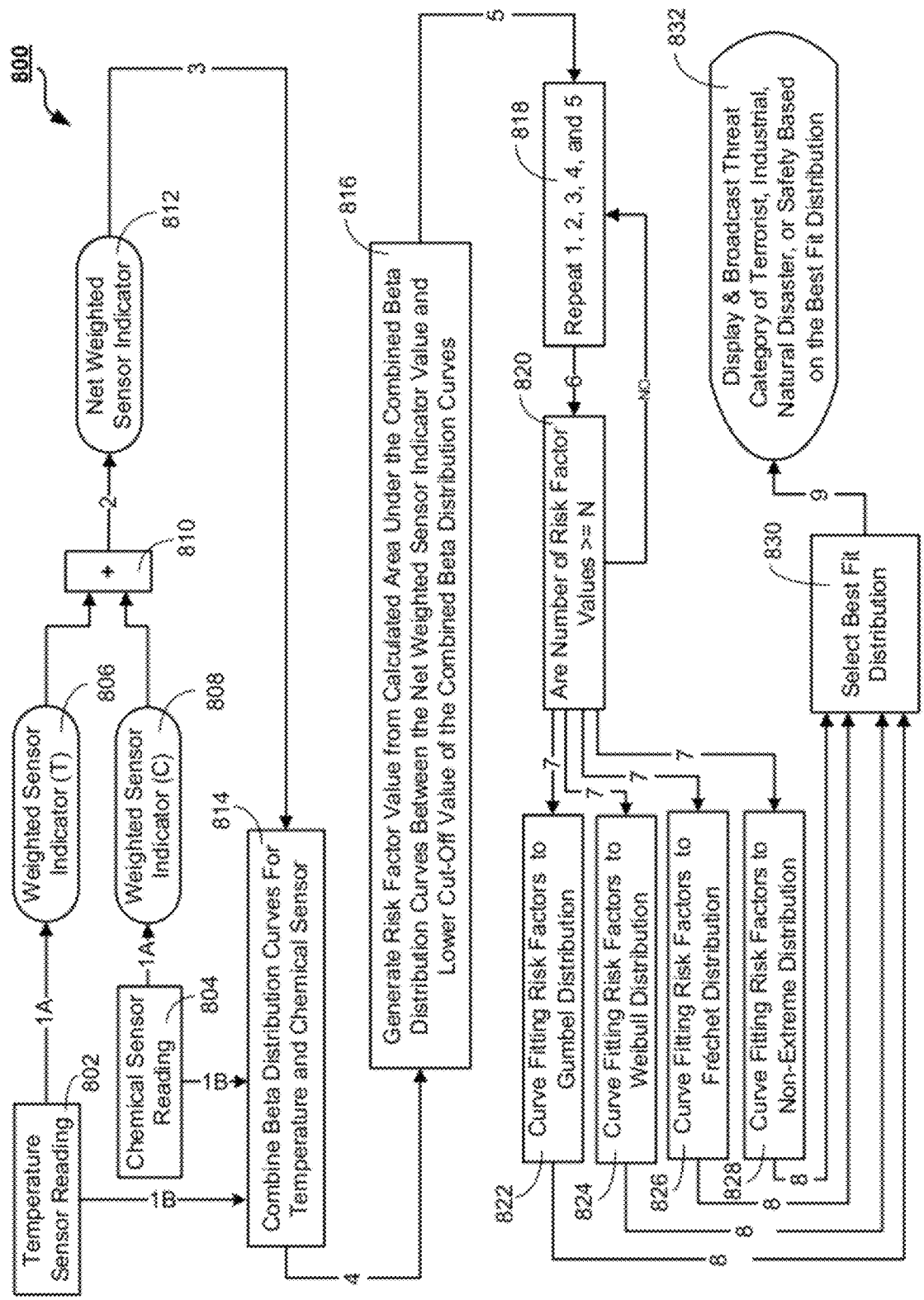
Figure 8 Example: Threat Determination Operation

Figure 11 Example: LiveDesign ERMS Modules

Example: Corrected Interval to Avoid Zero for β-Distribution

Example: False Alarm & System Failure Process

EMERGENCY RESPONSE MANAGEMENT APPARATUSES, METHODS AND SYSTEMS

PRIORITY CLAIM

Applicant hereby claims priority under 35 USC § 119 from U.S. provisional patent application Ser. No. 61/420,605, filed Dec. 7, 2010, entitled "SYSTEM AND METHOD FOR EMERGENCY EVENT MANAGEMENT." The entire contents of the aforementioned application are herein expressly incorporated by reference.

This patent application disclosure document (hereinafter "description" and/or "descriptions") describes inventive aspects directed at various novel innovations (hereinafter "innovation," "innovations," and/or "innovation(s)") and contains material that is subject to copyright, mask work, and/or other intellectual property protection. The respective owners of such intellectual property have no objection to the facsimile reproduction of the patent disclosure document by anyone as it appears in published Patent Office file/records, but otherwise reserve all rights.

FIELD

The present invention is directed generally to apparatuses, methods, and systems for detecting, analyzing and/or managing the occurrence of events, and more particularly, to EMERGENCY RESPONSE MANAGEMENT APPARATUSES, METHODS AND SYSTEMS.

BACKGROUND

Emergency events occur through a myriad of causal reasons, whether by virtue of natural occurrences (e.g., Hurricane Katrina), industrial disasters (e.g., BP Oil spill), or acts of terrorism (e.g., Sep. 11, 2001 attack on the Twin Towers in NY). In all cases, however, if an emergency event does occur, mitigation of human and/or structural losses to the extent possible may be achieved by utilizing, for example, effective/reliable emergency event detection and management.

SUMMARY

The EMERGENCY RESPONSE MANAGEMENT APPARATUSES, METHODS AND SYSTEMS (hereinafter "ERMS") transform emergency related inputs and sensor information into a threat indication category, which is distributed to individuals and/or first responders for managing the threat.

In one embodiment, an emergency management processor-implemented method may include receiving sensor readings from at least one sensor device, generating risk factors for the at least one sensor device using weighted sensor indications associated with the received sensor readings and a sensor statistical distribution associated with the at least one sensor device, and curve fitting the generated risk factors to a plurality of statistical distribution curves, where each of the statistical distribution curves is indicative of a threat category. The method further includes determining the threat category based on the generated risk factors providing a best fit with one of the plurality of statistical distribution curves.

According to another embodiment, an emergency management processor-implemented method includes receiving sensor readings from at least one sensor device, generating risk factors for the at least one sensor device, and curve fitting the generated risk factors to a plurality of statistical distribution curves including both non-extreme and extreme statistical distributions, whereby each of the plurality of statistical distribution curves is indicative of a threat category. The method includes determining the threat category based on the generated risk factors providing a best fit with one of the plurality of statistical distribution curves.

According to another embodiment, the non-extreme and extreme statistical distributions comprise a Gumbel Distribution, a Weibull Distribution, a Fréchet Distribution, and a Gaussian Distribution.

According to yet another embodiment, other risk factors may be generated for an infrastructure that is associated with the at least one sensor device such that the generated risk factors and the generated other risk factors are selectively adjustable by a human expert via the at least one sensor device for use in future determinations of the threat category.

According to yet another embodiment, an emergency management system may include a memory and a processor disposed in communication with the memory and configured to issue processing instructions stored in the memory. The processing instructions stored in the memory are executed to receive sensor readings from at least one sensor device, generate risk factors for the at least one sensor device using weighted sensor indications associated with the received sensor readings and a sensor statistical distribution associated with the at least one sensor device, curve fit the generated risk factors to a plurality of statistical distribution curves, whereby each of the statistical distribution curves is indicative of a threat category, and determine the threat category based on the generated risk factors providing a best fit with one of the plurality of statistical distribution curves.

According to yet another embodiment, a processor-readable tangible medium stores processor-issuable emergency management instructions that are executable to receive sensor readings from at least one sensor device, generate risk factors for the at least one sensor device using weighted sensor indications associated with the received sensor readings and a sensor statistical distribution associated with the at least one sensor device, curve fit the generated risk factors to a plurality of statistical distribution curves, whereby each of the statistical distribution curves is indicative of a threat category, and determine the threat category based on the generated risk factors providing a best fit with one of the plurality of statistical distribution curves.

According to yet another embodiment, an emergency management system may include a memory and a processor disposed in communication with the memory and configured to issue processing instructions stored in the memory. The processing instructions stored in the memory are executed to receive sensor readings from at least one sensor device, generate risk factors for the at least one sensor device, and curve fit the generated risk factors to a plurality of statistical distribution curves including both non-extreme and extreme statistical distributions, whereby each of the plurality of statistical distribution curves is indicative of a threat category. The threat category is then determined based on the generated risk factors that provide a best fit with one of the plurality of statistical distribution curves.

According to yet another embodiment, a processor-readable tangible medium stores processor-issuable emergency management instructions that are executable to receive sensor readings from at least one sensor device, generate risk factors for the at least one sensor device, and curve fit the generated risk factors to a plurality of statistical distribution curves including both non-extreme and extreme statistical distributions, whereby each of the plurality of statistical distribution curves is indicative of a threat category. The threat category is then determined based on the generated risk factors that provide a best fit with one of the plurality of statistical distribution curves.

BRIEF DESCRIPTION OF THE DRAWINGS

The accompanying appendices and/or drawings illustrate various non-limiting, example, inventive aspects in accordance with the present disclosure:

FIG. 4 is an operational flow diagram illustrating one aspect of a threat index tagging component in some embodiments of the ERMS;

FIG. 5 is an operational flow diagram illustrating one aspect of a threat index retrieving component in some embodiments of the ERMS;

FIGS. 6A-6D are operational flow diagrams illustrating aspects of a a event analyzer component in some embodiments of the ERMS;

FIG. 7 is an operational flow diagram illustrating one aspect of a threat simulation/learning component in some embodiments of the ERMS;

FIG. 8 shows a threat determination operation example based on the utilization of two sensors according to some embodiments of the ERMS;

DETAILED DESCRIPTION

ERMS

An Emergency Response Management System (hereinafter the "ERMS") facilitates, among other things, the ability to effectively detect and manage emergency events, provide an early warning mechanism in order to avoid emergency events, and/or provide emergency event scenario simulations for updating/training both the ERMS system and first responder staff (e.g., both governmental responders such as police and firefighters, as well as private onsite emergency staff).

Figure 1:
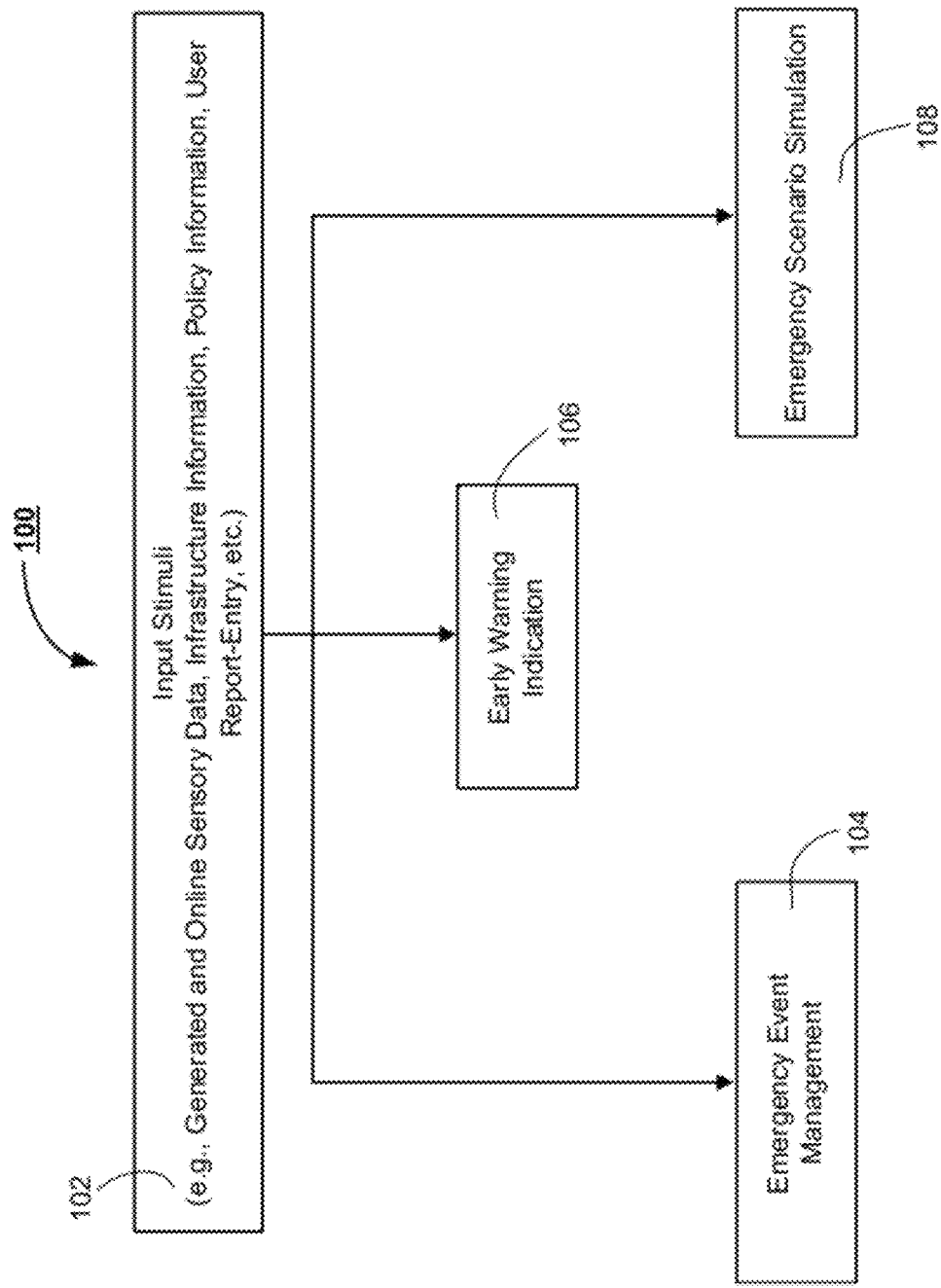
FIG. 1 is of a block diagram illustrating an example aspect of providing emergency related event management in some embodiments of the ERMS.

FIG. 1 is a block diagram 100 illustrating an example aspect of providing emergency related event management in some embodiments of the ERMS. The ERMS system receives input stimuli from various sources. For example, the input stimuli 102 may, for example, include generated sensor data and corresponding characteristic information, system user or administrator input(s), legal and policy information, and/or infrastructure information associated with a particular site employing the ERMS system. The input stimuli 102 may be used in conjunction with one or more analysis modules such as an emergency event management module 104, an early warning indication module 106, and an emergency scenario simulation module 108.

The emergency event management module 104 may, for example, analyze the received stimuli and classify the threat level in order to determine whether the threat rises to a higher security risk such as an industrial disaster, a natural disaster, or a terrorist threat/attack. The early warning indicator module 106 may, for example, analyze the received stimuli that are classified as a safety risk. Based on a detected stimulus or stimuli that are indicative of a safety risk, the early warning indicator module 106 is able to determine or establish whether the safety risk is capable of escalating towards an emergency event prior to its occurrence (i.e., an early warning).

The emergency scenario simulation module 108 may, for example, analyze simulated stimuli in order to classify a threat level (e.g., system failure, false alarm, safety risk, industrial disaster, a natural disaster, or a terrorist threat/attack). A system operator or safety administrator may then determine whether the ERMS system has correctly responded to the simulated conditions. If the ERMS system response requires adjusting, an emergency expert such as the system operator or safety administrator is able to enter alternative and/or additional system related parameters (e.g., sensor related data, infrastructure related data, etc.) in order for the system to achieve an optimal expected result.

Figure 2A:
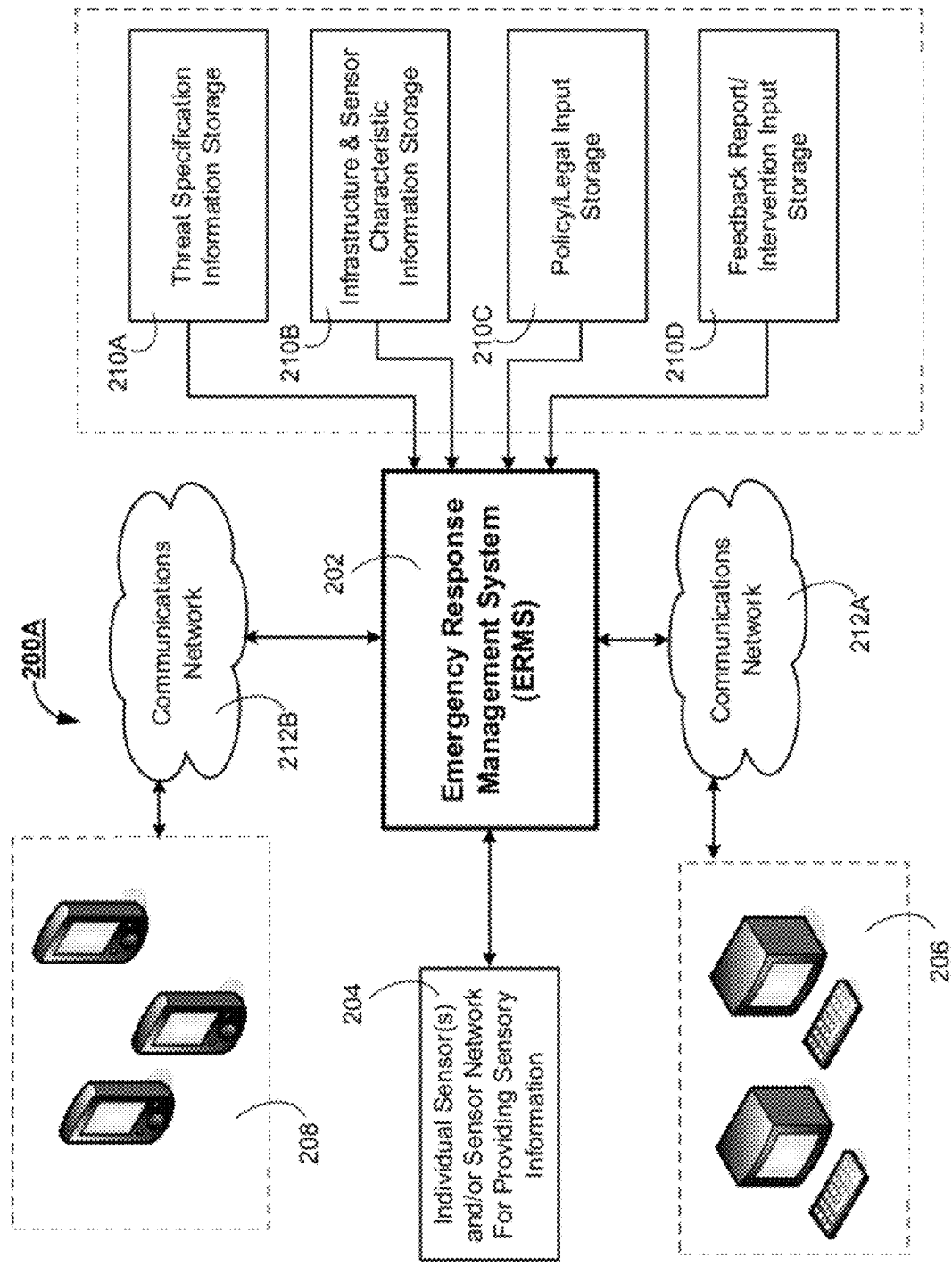
FIG. 2A is a block diagram illustrating an example architectural aspect in some embodiments of the ERMS.

FIG. 2A is a block diagram 200A illustrating an example architectural aspect in some embodiments of the ERMS. The example ERMS architecture 200A may include an emergency response management system unit 202 that facilitates the detection and analysis of emergency/safety events by communicating, either via one or more networks 212A-212B or directly, with one or more sensors 204 capable of generating real-time sensory information, a ERMS administration control system 206 for generating control/instruction information, mobile communication devices 208 for use by emergency/safety personnel for receiving emergency/safety event information, and a plurality of data sources 210A-210D including additional stimuli and information associated with the detection and analysis of emergency/safety events.

For example, data source 210A may include threat specification information, data source 210B may include infrastructure and sensor characteristic information, data source 210C may include inputted policy/regulation/legal information, and data source 210D may include feedback reports and intervention overriding inputs from human expert safety personal responsible for overseeing the operation of the ERMS.

While the data sources 210A-210D are illustrated as being directly coupled to the emergency response management system unit 202, these data sources may, for example, also communicate with the emergency response management system unit 202 via one or more other communication networks (not shown). Also, the data sources 210A-210D may be integrated within either a single memory device of multiple memory devices. Data sources 210A-210D may also directly communicate with the ERMS administration control system 206 via either a wireless, a wired, of a combined wireless/wired network.

Threat specification information associated with data source 210A, for example, include sensor types (e.g., temperature measurement, vibration detection and measurement, chemical concentration detection, etc.) used to detect a particular threat, the sensors' locations (e.g., laboratory 345G), sensor numbers per location (e.g., temperature sensors and 1 chemical CO detector at room 345G), etc.

Infrastructure and sensor characteristic information associated with data source 210B may include, for example, building/infrastructure floor plans, various schematics (e.g., electrical wiring, plumbing, ventilation, etc.), normalized (e.g., using fuzzy logic) sensor values that correspond to a sensor reading or range of readings, and operating specifications (e.g., sensor operating ranges, tolerances, reliability distribution curves over the operating ranges, etc.) associated with each of the sensors used in the ERMS. The sensors used by the ERMS are not limited to any particular type of sensor and vary based on implementation. For example, a ship building plant may use more vibration and mechanical strain type detection devices whereas a chemical plant may use more temperature measurement and chemical concentration detection devices. The sensors may be used to measure or record any type of stimulus capable of processing, such as video images, audio, and/or audio/visual data. Some sensors may generate and transmit output readings or data on a continuous basis, while other intelligent sensors may be programmable to only transmit output readings that exceed a particular range or based on being polled at a particular time by the emergency response management system unit 202. Some sensor device may generate a stimulus signal and measure a particular response to the generated stimuli. For example, some sensor devices incorporate laser devices that are used to emit particular wavelengths onto an area or substrate of interest. The reflection of the emitted wavelengths from the areas or substrates are then detected by these sensors and used by the ERMS for analysis.

The inputted policy/regulation/legal information associated with data source 210C may include legal information, for example, regarding privacy, which may, therefore, be used to determine where certain camera monitoring devices may be used. For example, certain policy information may require emergency events to be directly broadcast to local first responder units as well as mobilizing site-specific emergency/safety personnel. Regulatory information may, for example, include mandatory updating of all floor plan and schematic information in order to ensure up to date information for evacuation (e.g., safe removal of public/ employees) and threat management (e.g., how to enter floor/room to extinguish chemical fire) scenarios.

Feedback reports and intervention inputs associated with data source 210D may include information that has been entered by safety/emergency personnel to mitigate an emergency event. Some strategies and plans are better determined by a human expert with prior live experience in dealing with various emergencies or safety threats. The ERMS provides an opportunity to save and factor-in both the prior and contemporaneous experience of live experts when analyzing future emergency events.

The ERMS administration control system 206 may include one or more networked computers that allow emergency/safety personal to both monitor the output (e.g., displayed threat contours showing risk factors (see FIG. 14; reference numeral 1400) for the various locations of a site such as rooms, laboratories, halls, staircases, etc.) of the emergency response management system unit 202 and control various methods of managing an event (e.g., audio announcements for evacuations, personal and private information broadcasting to personnel, etc.). The ERMS administration control system 206 also allows authorized emergency/safety personnel to override certain parameters of the ERMS via communications network 212B and the emergency response management system unit 202. For example, sensor parameters and weighting factors (i.e., described in more detail in the following paragraphs) may be changed in order to optimize the ERMS's ability to more accurately and efficiently detect a particular category of threat (e.g., industrial disaster or terrorist attack). Since the ERMS enables the use of both objective information (e.g., sensor numerical output reading) and subjective information (e.g., room location of the sensor or sensor's manufacturer) in the analysis of an event occurrence, the ERMS administration control system 206 is able to vary or override both the objective and/or subjective information components. The ERMS administration control system 206 also controls any communications between the emergency response management system unit 202 and the mobile communication devices 208 that are used as part of the management of an emergency or safety related event. For example, the ERMS administration control system 206 selectively enables access by one or more of the mobile communication devices 208 to information generated by the emergency response management system unit 202. The emergency response management system unit 202 may also receive direct communication and guidance messages from the ERMS administration control system 206 during or prior to the occurrence of an emergency or safety related event. The emergency response management system unit 202 may also transmit the results of periodic or user-invoked simulations regarding the operation of the emergency response management system unit 202 to the ERMS administration control system 206.

The mobile communication devices 208 used by emergency/safety personnel for receiving emergency/safety event information may include any portable processing device capable of receiving communicated data (e.g., PDAs, Smart-phones, etc.). The mobile communication devices 208 may include an executing mobile application program that receives and display's any emergency and/or safety related information that is transmitted from the emergency response management system unit 202 via communication network 212B. The executing mobile application program may also receive and display any emergency and/or safety related information that is sent directly from the ERMS administration control system 206 via one or more other communication networks (not shown). The type of communication network (e.g., wireless, wired, or any combination thereof), operating frequencies, protocols, and security may depend on the particular location and industry that is utilizing the ERMS. For example, an oil platform may use a different communication infrastructure than that of a hospital or chemical plant.

Figure 2B:
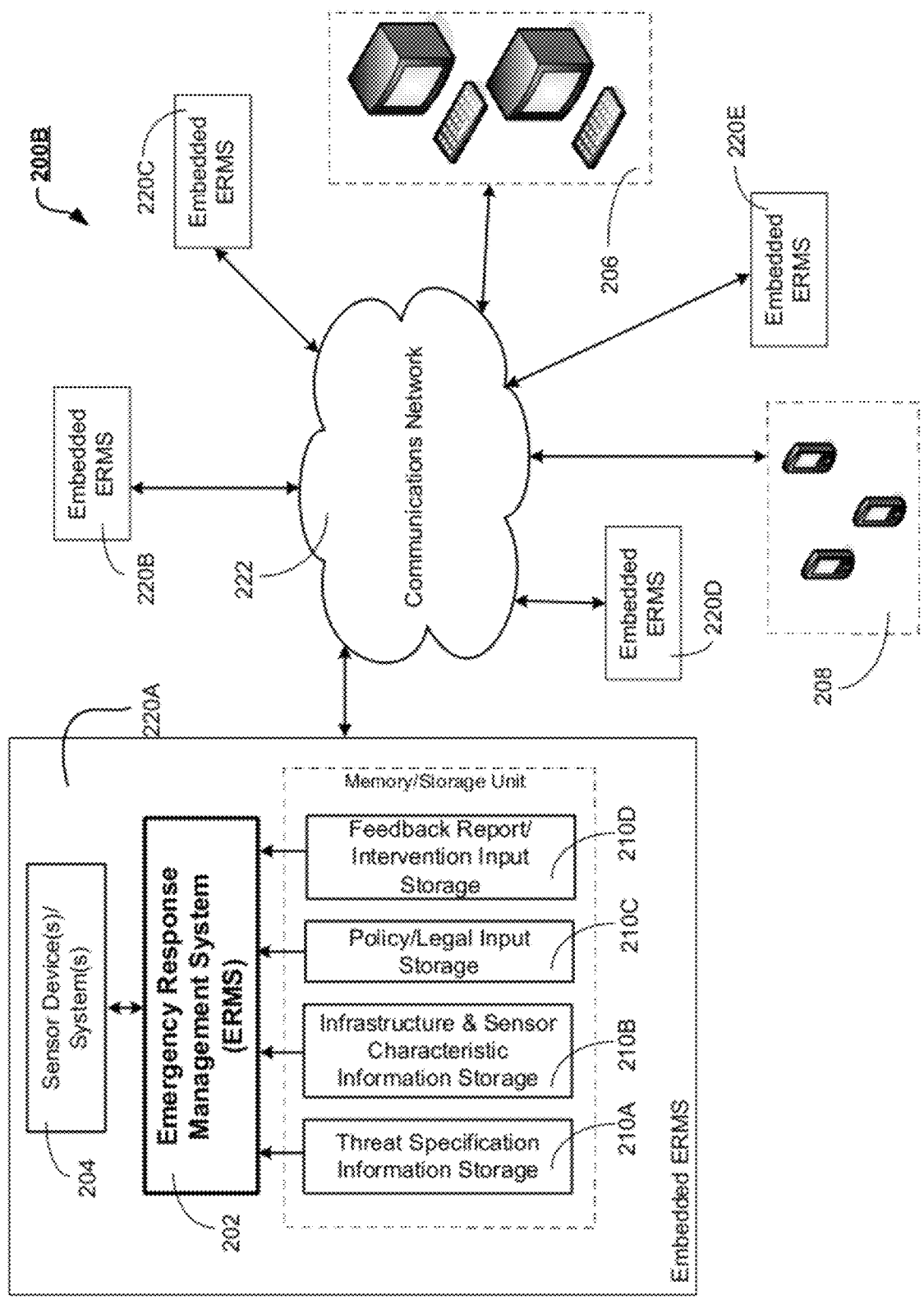
FIG. 2B is a block diagram illustrating an alternative example architectural aspect in some embodiments of the ERMS.

FIG. 2B is a block diagram 200B illustrating an alternative example architectural aspect in some embodiments of the ERMS. While the individual components of the ERMS in FIG. 2B may be identical to those described in FIG. 2A, FIG. 2B illustrates an embedded approach to implementing an ERMS. As shown, each embedded ERMS 220 includes an emergency response management system unit 202, one or more sensors 204, and a plurality of data sources 210A-210D that include additional stimuli and information associated with the detection and analysis of emergency/safety events. These components have been described above in relation with FIG. 2A. According to one embodiment, components 202, 204, and 210A-210D are implemented on one or more chip devices. Essentially, in such an exemplary implementation, all the analysis occurs at the physical location of the sensor device(s) 204. As such, the ERMS functions as a distributed parallel processing system where each sensor or set of sensor devices have their own dedicated emergency response management system unit and additional data sources. Embedded ERMS devices 220B-220E are identical to embedded ERMS 220A.

Embedded ERMS devices 220A-220E communicate with the ERMS administration control system 206 and the mobile communication devices 208 via communication network 222, as described above in relation to FIG. 2A. However, in this embodiment, the ERMS administration control system 206 and the mobile communication devices 208 are in communication with the emergency response management system unit of each embedded ERMS.

Figure 3:
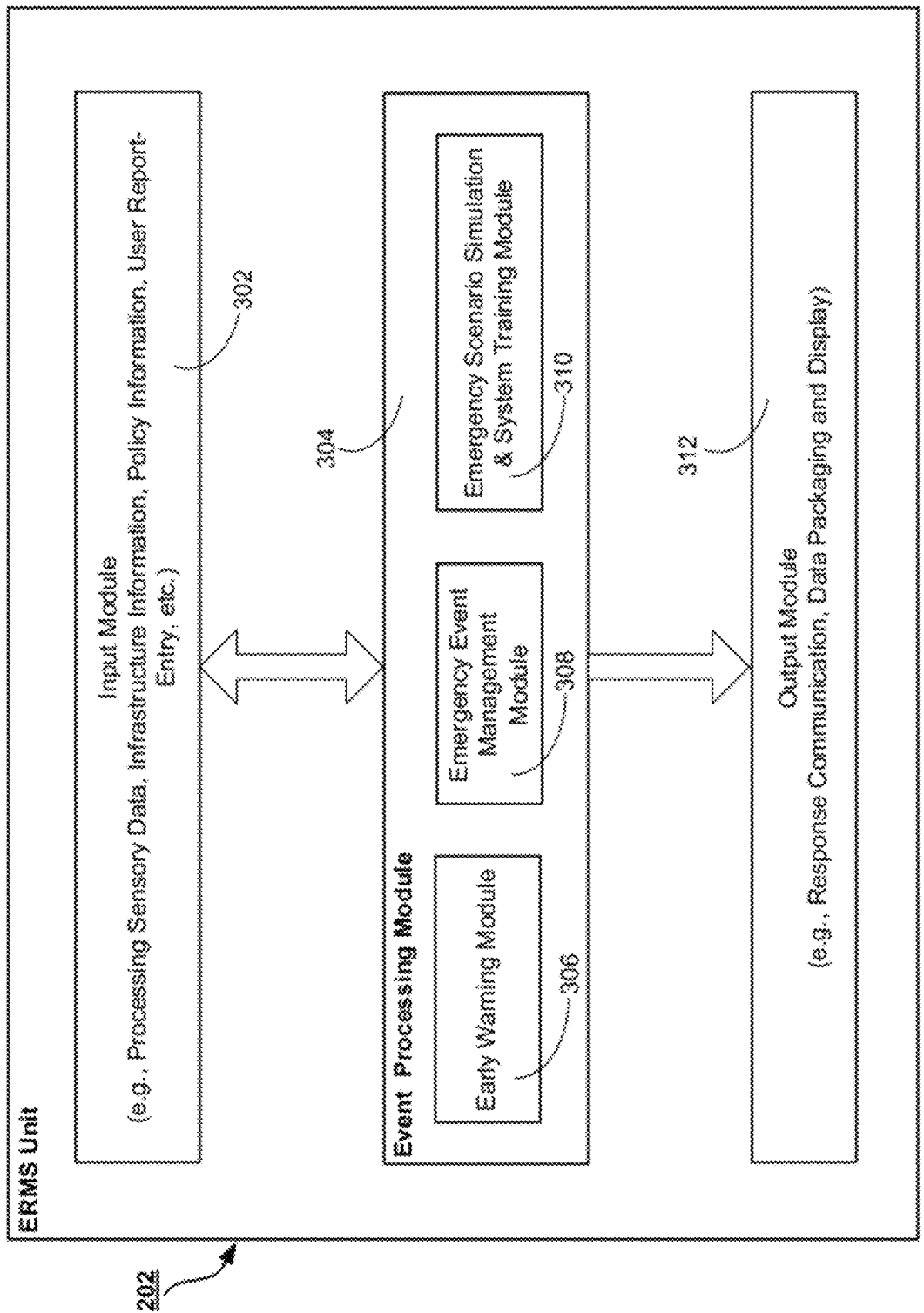
FIG. 3 is a block diagram illustrating one aspect of an emergency response management unit in some embodiments of the ERMS.

FIG. 3 is a block diagram illustrating one aspect of the emergency response management unit 202 of FIGS. 2A and 2B according to some embodiments of the ERMS. The emergency response management unit 202 may include an input module 302, an event processing module 304, and an output module 312.

The input module 302 may receive and format stimuli information from both the data sources 210A-210D (FIGS. 2A &2B) and the one or more sensors 204 that generate sensory information. Using the input module 302, the information from the data sources 210A-210D is formatted according a data structure that includes both a numerical (objective) component and a descriptive (subjective) component. The resultant data structure is also mapped to one or more of the sensors 204. For example, a temperature sensor having an ID code #1234 is mapped to one or more data structures also having the ID code #1234. The output reading of the temperature sensor may then be matched with the numerical (objective) component of one of the data structures. Based on a match, the descriptive (subjective) component is used to access a normalized sensor value (i.e., using Fuzzy logic) that is used in subsequent ERMS analysis steps, which may be described in more detail in the following paragraphs. In some implementations, both the numerical component used for matching and the normalized (e.g., Fuzzified) sensor value may be within the numerical component of the data structure. An example of a data structure is provided and described in relation to FIG. 6E. Based on the foregoing, the input module may include one or more memory devices (e.g., encrypted flash memory) for storing the generated data structures.

The event processing module 304 includes an early warning module 306, an emergency event management module 308, and an emergency scenario simulation & system training module 310. As previously described, the emergency event management module 308 processes and analyzes the received normalized sensor values and classifies a threat level in order to determine whether the threat rises to a higher security risk such as an industrial disaster, a natural disaster, or a terrorist threat/attack. The early warning indicator module 306 processes and analyzes the received normalized sensor values that are classified as a safety risk by the emergency event management module 308. Based on processed sensor values that are indicative of a safety risk, the early warning indicator module 306 is able to determine or establish whether the safety risk is capable of escalating towards an emergency event prior to its occurrence (i.e., an early warning). In some implementations, the early warning indicator module 306 and the emergency scenario simulation & system training module 310 may be integrated as a single module.

The emergency scenario simulation module 308 may, for example, analyze simulated sensor values in order to classify a threat level (e.g., system failure, false alarm, safety risk, industrial disaster, a natural disaster, or a terrorist threat/attack). A system operator or safety administrator may then determine whether the ERMS system has correctly responded to the simulated sensor-based conditions. If the ERMS system response requires adjusting, an emergency expert such as a system operator or safety administrator is able to enter alternative and/or additional system related parameters into, for example, the descriptive (subjective) components of the data structures (e.g., sensor related data, infrastructure related data, etc.) in order for the system to achieve an optimal expected result. A more detailed description of the event processing module's early warning module 306, emergency event management module 308, and emergency scenario simulation & system training module 310 is found in relation to the operational flow diagrams illustrated in FIGS. 4-7.

The output module 312 receives, from the event processing module 304, data values and information (e.g., X=0.6; Status: security range; Location: Room #315, Floor 2, West Building) that are indicative of risk or safety related issues, packages the received data values and information, and subsequently transmits the packaged data values and information to the ERMS administration control system 206 (FIGS. 2A & 2B). In addition, once the event processing module 304 establishes a security risk, audio/visual and/or imaging data associated with the location of the security risk may also be sent by the event processing module 304 to the output module 312. The output module 312 may then transmit the audio/visual and/or imaging data to the ERMS administration control system 206. Output module 312 may also provide various compression/decompression methodologies in order to maximize transmission speeds over the networks utilized by the ERMS. For example, the ERMS may provide an image compression technique that adopts a triangulation method capable of avoiding feature distortion that may occur as a result of the compression. In order to maximize response times when dealing with an emergency, electronic information exchange (e.g., transmission of image data) should occur in the most efficient manner. Thus, appropriate compression and bandwidth preservation may be implemented. In some implementations, however, a higher image resolution may be required (e.g., medical images, structural damage images, etc.) at the expense of increased bandwidth utilization.

FIG. 4 is an operational flow diagram illustrating one aspect of a threat index tagging component 400 in some embodiments of the ERMS. The threat index tagging component 400 may be implemented within the input module 302 (FIG. 3) and/or the emergency event management module 308 (FIG. 3) of the emergency response management system unit 202 (FIG. 3). The threat index tagging component 400 maps the sensor readings to normalized sensor values for the creation of data structures that may be utilized by the event processing module 304 (FIG. 3). Threat index tagging component 400 may also map textual information (e.g., subjective information input by experts, sensor characteristic information, etc.) to normalized values for the data structure creation process.

Thus, it is first determined whether the received input is in textual form 402 or is a sensor reading from a ERMS registered sensor 404. If the received input is a sensor reading from a system sensor, characteristic information associated with the sensor is accessed 406. The characteristic information may, for example, include the sensor's operating range and tolerances. Based on the accessed characteristic information of the sensor 406, each sensor output reading or range of output readings is assigned a numerical indicator value (e.g., 0-1.0) that is related to a level of threat 408. For example, a sensor may be designed to operate over a range of 80-100 degrees Celsius. A sensor reading of 90-93 degree may be assigned a value of 0.7 whereas a sensor reading between 80-85 may be assigned a value of 0 (zero). The 0.7 value is indicative of a potential threat whereas the 0 (zero) value is indicative of no threat. If the received input is a sensor reading from a non-system sensor, no action is taken unless the sensor is registered with the ERMS 401.

Once each sensor output reading or range of readings is assigned a numerical indicator value, each sensor reading or range of readings is tagged with its corresponding numerical indicator value 410. Thus, a sensor data structure may be formed which includes, for example, a sensor ID, a sensor reading of range of readings value, and a corresponding numerical indicator value. Additional (subjective) information associated with the sensor may also be added to the sensor data structure, which is subsequently stored in a memory device 412 within, for example, the input module 302 (FIG. 3) of the emergency response management system unit 202 (FIG. 3). As described in more detail below, additional (subjective) information associated with the sensor may include weighting factors that increase or decrease the relevance of a sensor's numerical indicator value from the perspective of the overall ERMS monitoring a site (e.g., factory, hospital, oil platform, etc.). Other additional (subjective) information associated with the sensor may include manufacturer reliability data associated with the sensor, statistical information corresponding to the operation (i.e., reliability) of the sensor over the desired operating range, mathematical operators to be used in applying the sensor's value to other elements (e.g., one or more other sensors, infrastructure information, etc.) working in cooperation the sensor.

If it is determined that the received input is in textual form 402, the textual information is accessed from the input 414. For example, the textual information may include information regarding site infrastructure such as a room (e.g., room location, number of windows, room contents, etc.) in which one or more sensors are located. Based on the accessed information associated with, for example, site infrastructure, each infrastructure area (e.g., rooms) or element (e.g., structural components) is assigned a numerical indicator value (e.g., 0-1.0) that is related to a level of threat 416. For example, a room may include flammable material or explosives and may, therefore, be assigned a value of 0.7 whereas a ground floor storage room holding metal parking signs may be assigned a value of 0 (zero). The 0.7 value is indicative of a potential threat whereas the 0 (zero) value is indicative of no threat.

Once any site infrastructure area or element is assigned a numerical indicator value, the site infrastructure area or element is tagged with its corresponding numerical indicator value 418. Thus, an infrastructure data structure may be formed which includes, for example, an infrastructure ID and an infrastructure numerical indicator value. Additional (subjective) information associated with the infrastructure may also be added to the infrastructure data structure, which is subsequently stored in a memory device 420 within, for example, the input module 302 (FIG. 3) of the emergency response management system unit 202 (FIG. 3). As described in more detail below, additional (subjective) information associated with the infrastructure may include weighting factors that increase or decrease the relevance of the infrastructure numerical indicator value from the perspective of the overall ERMS monitoring a site (e.g., factory, hospital, oil platform, etc.). Other additional (subjective) information associated with the infrastructure may include one or more sensors associated with the infrastructure, floor plan and schematic memory address information for accessing such floor plan and schematics, updated maintenance information associated with the infrastructure, and infrastructure contents.

FIG. 5 is an operational flow diagram illustrating one aspect of a threat index retrieving component 500 in some embodiments of the ERMS. The threat index retrieving component 500 may be implemented within the input module 302 (FIG. 3) and/or the emergency event management module 308 (FIG. 3) of the emergency response management system unit 202 (FIG. 3). In one implementation, the threat index retrieving component 500 correlates a sensor device or system's received sensory information such as, for example, real-time sensor data 502 with a corresponding stored data structure associated with that sensor device or system. The received real-time sensor data is mapped to a data structure storage device in order to access tagged sensor information that corresponds to the received sensor data 504. The received sensor data 504 is compared to the sensors output reading or range of output readings within a stored data structure (i.e., the numerical component of the data structure) for that sensor in order to determine whether a tagged entry exists 506. For example, if the received sensor data indicates a temperature value of 90 degrees Celsius, the stored data structures are searched in order to locate a data structure entry having a reading or range or readings value that matches 90 degrees Celsius. If such an entry exists, the corresponding numerical indicator value is retrieved 508. If such an entry does not exist, the system continues to receive sensor data. For example, one reason for not locating a tagged sensor reading may be that the received sensor data (e.g., 18 degrees Celsius) is out of range (e.g., range: 80-100 degrees Celsius) and of no interest to the ERMS since there is no threat posed by such a temperature reading. In this manner, the ERMS is able to avoid the processing of sensor values that may be redundant and unnecessary for the purpose of detecting a potential threat of an emergency.

If a tagged entry for the sensor reading is located, it is next determined whether the corresponding data structure includes a tagged textual information component (i.e.; the textual component of the data structure) as well the indentified numerical indicator value 510. If the data structure includes a tagged textual information component, the tagged textual information is accessed in order to retrieve additional textual and sensor-related information 512. The sensor-related information may, for example, include sensor upper and lower operating cut-off range, a standard deviation value for the sensor operation over the upper and lower operating cut-off range, and a mean value for the sensor operation over the upper and lower operating cut-off range. Other sensor-related information 512 may include a reliability factor based on the manufacturer of the sensor.

The sensor-related information may, for example, include memory access information for retrieving stored infrastructure data structures that are associated with the sensor. For example, infrastructure data structures that are associated with the sensor may include information regarding structural elements and/or areas (e.g., room, hall, etc.) that the sensor is located in. The information regarding the structural elements and/or areas may also, as with the sensors, include assigned weighting factors and numerical indicator values based on various attributes (e.g., room's floor location, contents stored in room, adjacent rooms and their respective content, etc.).

The sensor's data structure including both the tagged textual and tagged sensor information is then sent for analysis in order to determine the level of threat 516. If it is determined that the corresponding data structure does not include a tagged textual information component (i.e., the textual component of the data structure) 510, according to one implementation, the retrieved numerical indicator value for the sensor is sent for analysis and threat level determination 514. According to another implementation, the sensor's data structure including the retrieved numerical indicator value is sent for analysis and threat level determination 514.

FIGS. 6A-6D are operational flow diagrams illustrating example aspects of a event analyzer component in some embodiments of the ERMS. The event analyzer component 600 receives the data structures and utilizes the values and information corresponding to both the numerical and textual components of such data structures to generate risk factors that are subsequently used to determine the level of threat. The event analyzer component 600 may be implemented in both the emergency event management 308 (FIG. 3) and the early warning 306 (FIG. 3) modules of the event processing module of the emergency response management system (ERMS) unit 202 (FIG. 3). In some implementations, the event analyzer component 600 may be functionally divided between the emergency event management 308 and the early warning 306 modules.

Referring to FIG. 6A, once the tagged textual information (e.g., infrastructure information) and tagged sensor information (e.g., sensor related information) are received and accessed from the stored data structures 602, the tagged textual information and tagged sensor information are each respectively parsed into numerical and textual components for analysis and processing 604.

For example, the numerical component of the tagged sensor information may include a numerical indicator value (x2) that corresponds to a room's sensor output reading, while the textual component of the tagged sensor information may include a weighting factor (W2) that corresponds to the sensor's degree of importance as an environmental monitoring device. Thus, the weighting factor may be classified as subjective information since it may be assigned by safety experts that are responsible for the ERMS installation and/or monitoring. The subjective textual components may be edited in the form of updates by the safety experts in order to optimize the ERMS performance.

Similarly, for example, the numerical component of the tagged textual information may include a numerical indicator value (x1) that corresponds to the room's location, size, and contents (e.g., flammable chemicals and gas cylinders), while the textual component of the tagged textual information may include a weighting factor (W1) that corresponds to the room's degree of threat relative to the overall infrastructure of which the room is part of.

Thus, following the parsing 604, the textual component of the received tagged textual information (e.g., received textual information data structure) is utilized for accessing corresponding numerical weighting factor W1, where as previously described, numerical weighting factor W1 may correspond to a particular infrastructure's (e.g., room's) degree of threat relative to the overall infrastructure 606.

Also following the parsing 604, the textual component of the received tagged sensor information (e.g., received sensor information data structure) is utilized for accessing corresponding numerical weighting factor W2, where as previously described, numerical weighting factor W2 may correspond to the sensor's degree of importance as an environmental monitoring device 608.

Once the weighting factors are accessed, a mathematical operator (e.g., based on interval arithmetic) may be determined from either or both the textual components of the tagged textual information and the tagged sensor information 610. Also, accessed numerical weighting factor W1 is multiplied by the numerical indicator value x1 of the numerical portion of the received tagged textual information 612, which generates a first weighted numerical indicator ($N_{wi1}$).

Similarly, referring to FIG. 6B, accessed numerical weighting factor W2 is multiplied by the numerical indicator value x2 of the numerical portion of the received tagged sensor information 614, which generates a second weighted numerical indicator ($N_{wi2}$). The first weighted numerical indicator ($N_{wi1}$) and the second weighted numerical indicator ($N_{wi2}$) are then added to generate a weighted event indicator value ($N_e$) 616. The weighted event indicator value ($N_e$) is used in association with a statistical distribution that corresponds to the sensor device. For example, a Beta Distribution curve is generated based on statistical information of the sensor (e.g., upper/lower operating cut-off limits for the sensor, a calculated mean ($\mu_s$) for the sensor over the cut-off limits, a standard deviation ($\sigma_s$) for the sensor over the cut-off limits) that is retrieved from the textual component of the tagged sensor information 618. The statistical information of the sensor is derived either through laboratory testing and evaluation prior to field use, or based on information provided by the manufacturer of the sensor. This statistical information for the sensor may also be directly adjusted during field use by input from ERMS safety personnel via, for example, the ERMS administration control system 206 (FIGS. 2A & 2B). The weighted event indicator value ($N_e$) is applied to the generated Beta Distribution curve such that the area under the generated B Distribution curve from the weighted event indicator value ($N_e$) to the lower operating cut-off limit is calculate to determine a risk factor value ($R_{factor}$) 620. The determined risk factor value ($R_{factor}$) is also utilized to determine a threat classification, which may include a false alarm, a safety risk, an emergency risk, or a system failure 622. For example the generate Beta Distribution curve may be divided into a plurality of sections between the upper and lower cut-off limits (e.g., see FIG. 10). A relatively small section between the lower-cut-off limit and a first cut-off value above the lower cut-off and below the upper cut-off limit may be designated as a false alarm region. If the risk factor value ($R_{factor}$) lies within this region, a false alarm is declared and, therefore, no emergency action is taken. Maybe, an investigation into the reason for the false alarm is conducted. Another relatively small section between the upper cut-off limit to a second cut-off value below the upper cut-off and above the lower cut-off limit may be designated as a system failure region. If the risk factor value ($R_{factor}$) lies within this region, it may be an indication that the system is unable to reliably make any safety/emergency based determination (e.g., overload condition). If the risk factor value ($R_{factor}$) lies between the first and the second cut-off values, it is an indication of either a safety or security risk 622. Thus, the calculated risk factor value ($R_{factor}$) is sent to a threat category determining component 624. The threat category determining component 601 (FIG. 6C) may, for example, be implemented as either a part of the event analyzer component 600 (FIGS. 6A & 6B), or a separate component in communication with the event analyzer component 600.

In some implementations, a room or area of the infrastructure may incorporate multiple sensors. In such a case, for example, a net Beta Distribution curve is generated based on the statistical information for all the multiple sensors. Thus, the determined mathematical operator 610 (FIG. 6A) dictates the manner in which the statistical information is manipulated. For example, for two temperature sensor devices, interval arithmetic (e.g., see heading: "Binary Operations") may be used in the addition (or multiplication) of the mean ($\mu$) and the standard deviation ($\sigma$) values of both temperature sensors. Based on a newly generated mean ($\mu$) and standard deviation ($\sigma$) value following such an addition process, a net Beta Distribution curve is generated. Different mathematical operations may be employed based on the types or sensor devices that are used in the generated net Beta Distribution curve. Moreover, in other implementations, instead of Beta Distribution curves, one or more sensors within an area of the infrastructure may be represented by other mathematical models and resulting curves. In addition, according to one implementation, a customized look-up table may be used to map the combined weighted numerical indicator values for each area of the infrastructure to a risk factor ($R_{factor}$).

Referring to FIG. 6C, it is determined whether the number of calculated risk factors ($R_{factor}$) is greater than or equal to a predetermined number of calculated risk factors ($R_{factor}$) 626. If not, the event analyzer component 600 (FIG. 6A) continues to receive and process tagged textual information and tagged sensor information 602 (FIG. 6A). If it is determined that the number of calculated risk factors ($R_{factor}$) is greater than or equal to a predetermined number of calculated risk factors ($R_{factor}$) 626, the predetermined number of calculated risk factors ($R_{factor}$) are curve fitted to a mathematical Gumbel Distribution 628. If the calculated risk factors ($R_{factor}$) correlate with the Gumbel Distribution 630, it may be an indication of a natural disaster 632. The mathematical shape of the Gumbel Distribution (e.g., given by equation: $e^{-e^{(-x)}}$) is such that when the processed sensor and infrastructure information, within a certain degree of correlation, follow its curve, a determination is made that a security risk corresponding to a natural disaster is occurring or has occurred. Accordingly, the ERMS safety personnel dispatch one or more disaster management protocols on the basis of this determination.

If the predetermined calculated risk factors ($R_{factor}$) fail to correlate with the Gumbel Distribution, they are curve fitted to a mathematical Weibull Distribution 634. If the calculated risk factors ($R_{factor}$) correlate with the Weibull Distribution 636, it may be an indication of an industrial disaster 640. The mathematical shape of the Weibull Distribution (e.g., given by equation: $1-e^{-(x/\lambda)^k}$) is such that when the processed sensor and infrastructure information, within a certain degree of correlation, follow its curve, a determination is made that a security risk corresponding to an industrial disaster is occurring or has occurred. Accordingly, the ERMS safety personnel dispatch one or more disaster management protocols on the basis of this determination.

If the predetermined calculated risk factors ($R_{factor}$) fail to correlate with the Weibull Distribution, they are curve fitted to a mathematical Fréchet Distribution 642. If the calculated risk factors ($R_{factor}$) correlate with the Fréchet Distribution 644, it may be an indication of an industrial disaster terrorist attack. The mathematical shape of the Fréchet Distribution (e.g., given by equation: $e^{-x^{-\alpha}}$) is such that when the processed sensor and infrastructure information, within a certain degree of correlation, follow its curve, a determination is made that a security risk corresponding to a terrorist attack is occurring or has occurred 646. Accordingly, the ERMS safety personnel dispatch one or more counter measures and management protocols on the basis of this determination.

The Weibull, Gumbel, and Fréchet Distributions are known as extreme value statistics. If is determined that the predetermined calculated risk factors ($R_{factor}$) fail to correlate with the Fréchet Distribution, the risk factors ($R_{factor}$) are sent to an early warning component 603 (FIG. 6D). The early warning component 603 (FIG. 6D) may, for example, be implemented as either a part of the event analyzer component 600 (FIGS. 6A & 6B), part of the threat category determining component 601 (FIG. 6C), or a separate component in communication with the event analyzer component 600.

Referring to FIG. 6D, if it is determined that the predetermined calculated risk factors ($R_{factor}$) fail to correlate with the Fréchet Distribution, they are curve fitted to a mathematical Gaussian Distribution 648 (i.e., a non-extreme distribution function). The mathematical shape of the Gaussian Distribution (e.g., given by equation:

$$\frac{1}{\sqrt{2\pi\sigma^2}}e^{\frac{-(x-\mu)^2}{2\sigma^2}})$$

is such that when the processed sensor and infrastructure information, within a certain degree of correlation, follow its curve, a determination is made that a safety related risk may exist. Accordingly, the ERMS safety personnel may utilize one or more management protocols in order to investigate this risk.

If the calculated risk factors ($R_{factor}$) correlate with the Gaussian Distribution 650, and it is further determined that the calculated risk factors ($R_{factor}$) are increasing 652, a report is compiled and sent to safety personnel for expert opinion analysis in order to determine whether the processed event is likely to escalate to an industrial disaster, a natural disaster, or terrorist related attack 654. If, however, it is determined that the calculated risk factors ($R_{factor}$) are not increasing 656, the ERMS continues to receive and process tagged textual and sensor information 602 (FIG. 6A). If the experts, upon further analysis, determine that the event is likely to escalate to a security risk event 656, counter measures may be broadcast to various safety personnel teams and/or first responders 660. As previously described, the broadcasts may include compression for bandwidth preservation. The broadcasts may also employ encryption for data security and integrity.

Figure 6E:
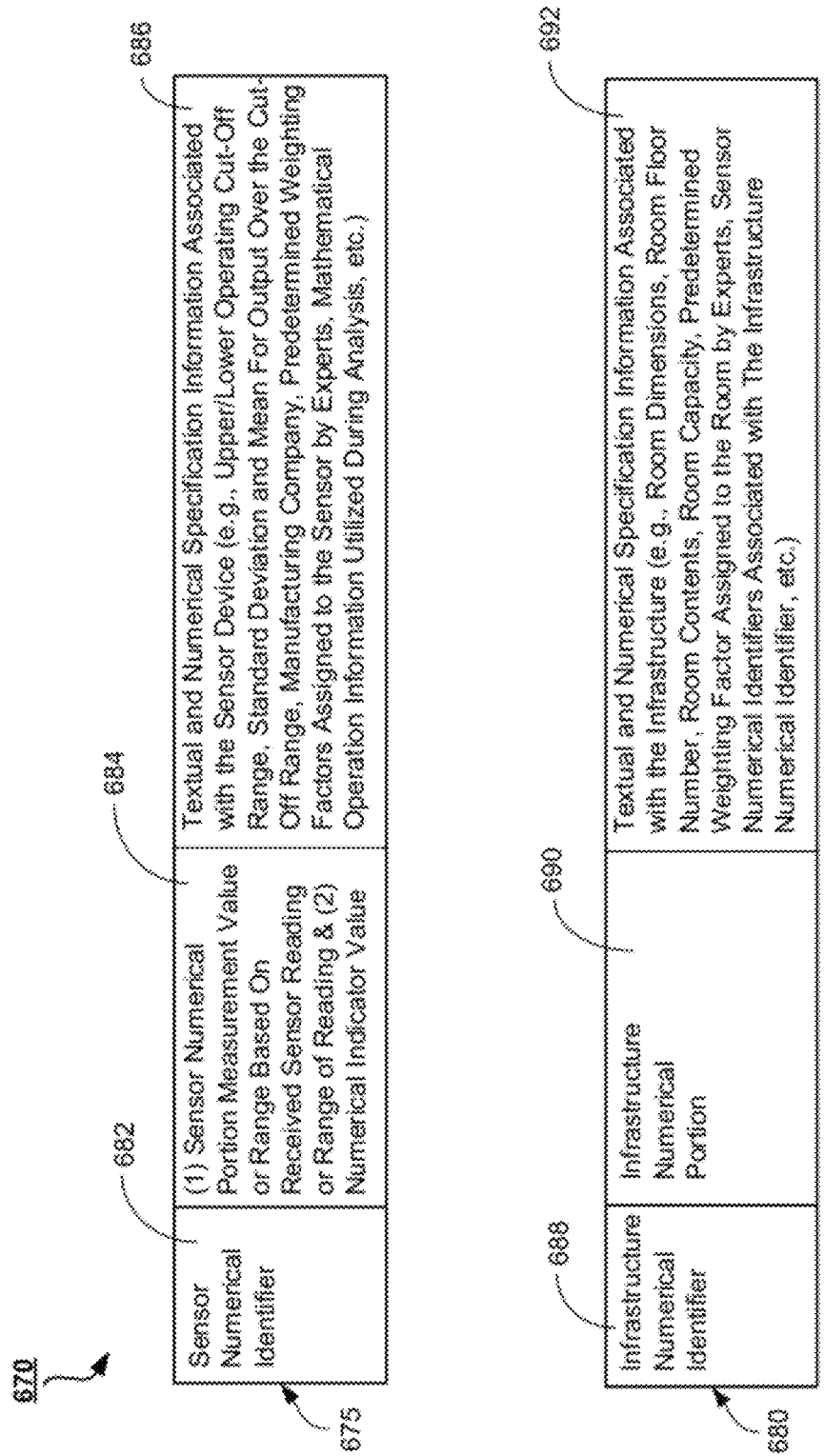
FIG. 6E is a data structure illustrating one aspect of tagged information in some embodiments of the ERMS.

FIG. 6E is a data structure illustrating one aspect of tagged information 670 in some embodiments of the ERMS. As previously described, tagged information may be stored as data structures that include both a numerical component and a textual component. For example, a tagged sensor information data structure 675 and a tagged textual information data structure 680 is shown.

In the provided examples, the tagged sensor data structure may include a sensor numerical identifier portion 682, a sensor numerical portion 684 (i.e., the numerical component), and a textual and numerical specification information portion 686 associated with the sensor device (i.e., the textual component). The sensor numerical identifier portion 682 identifies the sensor device within the ERMS. The ERMS administration control system 206 (FIG. 2) may, for example, access a sensor within the ERMS using a particular sensor's sensor identifier.

The sensor numerical portion 684 includes a numerical value of a sensor reading or a range of sensor readings, and a corresponding normalized (e.g., using Fuzzy Logic) numerical indicator value. When a sensor device outputs a reading, the value of this reading is mapped to a tagged sensor information data structure that has a matching numerical value (or range of values) within its sensor numerical portion 684 to that of the sensor's outputted reading. Once a match is determined, the corresponding normalized numerical indicator value is utilized for analysis and processing.

The textual component comprising the numerical specification information portion 686 associated with the sensor device (i.e., the textual component) may include both numerical and textual information associated with the sensor. This information is subjective in the sense that it may be added or edited according to the experience and expertise of safety personnel and system operators. For example, the numerical information portion of the textual component may include, for example, a weighting factor associated with the level importance of the sensor's output during the analysis of various sensor output values. The weighting factor may be adjusted by a system administrator via the ERMS administration control system 206 (FIG. 2) in order to optimize the analysis/processing capabilities of the ERMS based on expert opinion. For example, other numerical information associated with the textual component may include, for example, the sensor's upper/lower operating cut-off limits, the sensor's standard deviation and mean values over the operating range, the sensors environmental tolerances, and a reliability factor based on the manufacturer of the sensor.

For example, the textual information portion of the textual component may include, for example, the name/address of the manufacturing company of the sensor, the location of the sensor within the infrastructure, and a mathematical operator qassociated with the analyzing of the sensor in conjunction with other sensors. For example, using interval arithmetic, the statistical Beta Distribution information for a sensor (e.g., temperature sensor) may require an add operation (e.g., see heading: "Binary Operations"). For different sensors, for example, another mathematical operation (e.g., multiplication) (e.g., see heading: "Binary Operations") or series of operations (e.g., add & subtraction) may be required and, thus, included in the textual information portion of the textual component. In some implementations, instead of the use of Beta Distribution information for each sensor, other mathematical models or predetermined-tables may be included in the textual information portion of the textual component in order to directly provide a risk factor.

In the provided examples, the tagged infrastructure data structure 680 may include an infrastructure numerical identifier portion 688, an infrastructure numerical portion 690 (i.e., the numerical component), and a textual and numerical infrastructure specification portion 692 (i.e., the textual component). The infrastructure numerical identifier 688 identifies the infrastructure area or element within the ERMS. The ERMS administration control system 206 (FIG. 2) may, for example, access information or images (e.g., via cameras) of infrastructure areas or elements within the ERMS using a particular infrastructure's numerical identifier.

The infrastructure numerical portion 690 includes a normalized numerical indicator value that corresponds to the infrastructure. The textual and numerical infrastructure specification portion 692 (i.e., the textual component) may include both numerical and textual information associated with the infrastructure. This information is also subjective in the sense that it may be added or edited according to the experience and expertise of safety personnel and system operators. For example, the numerical information portion of the textual component may include, for example, a weighting factor associated with the level of risk associated with the infrastructure during analysis and processing. The weighting factor may be adjusted by a system administrator via the ERMS administration control system 206 (FIG. 2) in order to optimize the analysis/processing capabilities of the ERMS based on expert opinion. For example, other numerical information associated with the textual component may include, for example, the infrastructure's (e.g., a room) location, the infrastructure's size, the infrastructure's doors and emergency exits, the infrastructure's contents (e.g., explosives or linen storage), the infrastructure's capacity, and one or more sensor numerical identifiers that are associated with (e.g., located within, around, and/or in proximity) the infrastructure.

FIG. 7 is an operational flow diagram illustrating one aspect of a threat simulation/learning component 700 in some embodiments of the ERMS. The threat simulation/learning component 700 provides ERMS system operators and safety personnel with the opportunity to evaluate the ERMS' capabilities concerning its response to a set of input that may simulate reading from sensors. Based on this evaluation, a variety of system parameter such as, for example, weighting factors, sensor operating limits, and/or assigned (i.e., normalized) numerical indicator values may be adjusted to generate a more accurate (i.e., concrete) emergency category determination. In one implementation, the threat simulation/learning component 700 may be formed within the emergency scenario simulation and system training module 310 (FIG. 3) of the ERMS unit's 202 (FIG. 3) event processing module 304 (FIG. 3).

Accordingly, the threat simulation/learning component 700 may generate a simulated sensor output by using, for example, a pseudo random number generator 702. Corresponding risk factors ($R_{factor}$) are then determined based on the simulated sensor outputs generated by the pseudo random number generator 704. The risk factors ($R_{factor}$) are used for curve fitting to both the extreme and non-extreme statistical distributions, and the subsequent determination of a simulated threat category 706.

The generated risk factors and the determined threat category are analyzed by safety/emergency experts 708. If the experts agree with the results of the simulation 710, the current ERMS settings and factors (e.g., weighting factors, numerical indicator values, etc.) are validated as providing the desired response to one or more simulated threat scenarios 714. If, on the other hand, the experts are unsatisfied with the results of the simulation 710, the current ERMS settings and factors (e.g., weighting factors, numerical indicator values, etc.) that are associated with the determined risk factors ($R_{factor}$) are adjusted 712. Once the experts have made the necessary adjustments via, for example, the ERMS administration control system 206 (FIG. 2), simulation is re-started by returning to processes 702-710.

FIG. 8 shows a threat determination operation 800 example for two sensors according to some embodiments of the ERMS. The current example provides an example of how two sensors (i.e., a chemical and temperature sensor) associated with an infrastructure are processed according to earlier described components (e.g., components 600, 601, and 603). A temperature sensor reading 802 is processed in order to generate a weighted temperature sensor numerical indication value 806 (T). A chemical sensor reading 804 is also processed in order to generate another weighted sensor numerical indication value 808 (C). The weighted sensor numerical indication value (T) and the weighted chemical sensor numerical indication value 806 (C) are added 810 to generate a net weighted sensor indication value 812.

Each of the temperature and the chemical sensors have a respective Beta Distribution curve, which are both combined according to interval arithmetic formulas (e.g., see heading: "Binary Operations") in order to generate a combined Beta Distribution curve that is associated with both sensors 814. For example, an (interval) addition operation may be utilized to combine the Beta Distribution information (i.e., mean (µ), standard deviation (σ), and upper/lower cut-off limits) of each sensor. The net weighted sensor indication value 812 is used in conjunction with the generated combined Beta Distribution for both sensors 814 in order to generate a risk factor value 816.

The risk factor value is generated 816 by calculating the area under the combined Beta Distribution curve of both sensors between the net weighted sensor indication value and the lower cut-off limit value of the combined Beta Distribution curve. Processing along paths 1A, 1B, 2, 3, 4, 5, and 6 continues 818 until the number of calculated risk factors for the sensors reach a predetermined limit 820 (N). Once enough risk factor values exist for curve fitting, the risk factors are curve fitted to a Gumbel Distribution 822, a Weibull Distribution 824, a Fréchet Distribution 826, and a Non-extreme Distribution such as a Gaussian Distribution 828. Once a best fit distribution from among the distributions is determined, a threat category is established 830.

For example, a curve fit with the Gumbel Distribution may establish a natural disaster category. A curve fit with the Weibull Distribution may establish an industrial disaster category. A curve fit with the Fréchet Distribution may establish a terrorist attack category. A curve fit with a Non-extreme Distribution such as a Gaussian Distribution may establish a safety risk category. The Gumbel, Weibull, and Fréchet Distributions are extreme statistical distributions while the Gaussian Distribution is a non-extreme distribution.

Once the threat category for the sensors associated with the infrastructure is determined, the threat category and location of the threat is transmitted, reported, and displayed at the ERMS administration control system 206 (FIG. 2). As previously described, each sensor has subjective textual information that includes information about its location within the infrastructure. In addition, when a threat associated with a particular area of the infrastructure is detected and categorized, video or still images prior to and up to the detected event which correspond to that area are also transmitted to the ERMS administration control system 206 (FIG. 2) for further validation and visual analysis of the type of threat.

While the described and illustrated implementations are exemplary in nature and for brevity describe the processing of one or more sensors and infrastructure information, the ERMS may process many different types of sensor device that include any type of sensing such as, but not limited to, environmental sensing (e.g., temperature, chemicals, etc.), imaging (e.g., laser-based, spectroscopy, digital-signal-processing based, etc.), audio detection (e.g., microphone based sensors, etc.), audio/visual monitoring (e.g., various types of camera device), and structural sensing (e.g., vibration detection, crack or fatigue detection, etc.).

ERMS Controller

Figure 9:
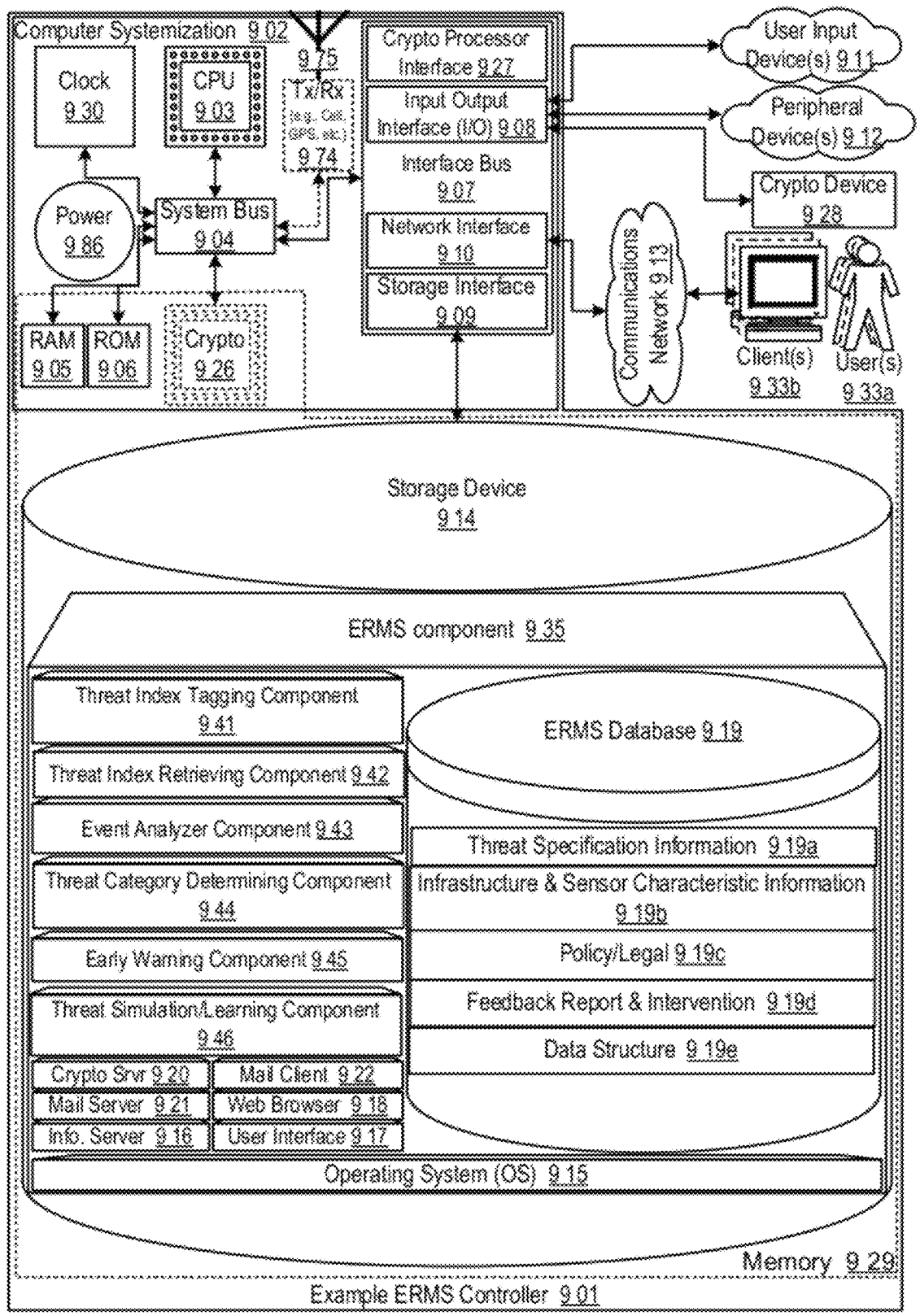
FIG. 9 is of a block diagram illustrating embodiments of the ERMS controller.

FIG. 9 illustrates inventive aspects of an ERMS controller 901 in a block diagram. In this embodiment, the ERMS controller 901 may serve to aggregate, process, store, search, serve, identify, instruct, generate, match, and/or facilitate interactions with a computer through various technologies, and/or other related data.

Typically, users, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to provide various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the ERMS controller 901 may be connected to and/or communicate with entities such as, but not limited to: one or more users from user input devices 911; peripheral devices 912; an optional cryptographic processor device 928; and/or a communications network 913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The ERMS controller 901 may be based on computer systems that may comprise, but are not limited to, components such as: a computer systemization 902 connected to memory 929.

Computer Systemization

A computer systemization 902 may comprise a clock 930, central processing unit ("CPU(s)" and/or "processor(s)" (these terms are used interchangeable throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) 902 having conductive and/or otherwise transportive circuit pathways through which instructions (e.g., binary encoded signals) may travel to effect communications, operations, storage, etc. Optionally, the computer systemization may be connected to an internal power source 986. Optionally, a cryptographic processor 926 may be connected to the system bus. The system clock typically has a crystal oscillator and generates a base signal through the computer systemization's circuit pathways. The clock is typically coupled to the system bus and various clock multipliers that may increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves may incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1029 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the ERMS controller and beyond through various interfaces. Should processing requirements dictate a greater amount speed and/or capacity, distributed processors (e.g., Distributed ERMS), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the ERMS may be achieved by implementing a microcontroller such as CAST's R8051XC2 microcontroller; Intel's MCS 51 (i.e., 8051 microcontroller); and/or the like. Also, to implement certain features of the ERMS, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the ERMS component collection (distributed or otherwise) and/or features may be implemented via the microprocessor and/or via embedded components; e.g., via ASIC, coprocessor, DSP, FPGA, and/or the like. Alternately, some implementations of the ERMS may be implemented with embedded components that are configured and used to achieve a variety of features or signal processing.

Depending on the particular implementation, the embedded components may include software solutions, hardware solutions, and/or some combination of both hardware/software solutions. For example, ERMS features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the ERMS features. A hierarchy of programmable interconnects allow logic blocks to be interconnected as needed by the ERMS system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the ERMS may be developed on regular FPGAs and then migrated into a fixed version that more resembles ASIC implementations. Alternate or coordinating implementations may migrate ERMS controller features to a final ASIC instead of or in addition to FPGAs. Depending on the implementation all of the aforementioned embedded components and microprocessors may be considered the "CPU" and/or "processor" for the ERMS.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the ERMS thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the ERMS controller is accessible through remote clients 933b (e.g., computers with web browsers) by users 933a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed ERMS), architectures may similarly be employed to pool, load balance, and/or otherwise increase the communicative bandwidth required by the ERMS controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 911 may be card readers, dongles, finger print readers, gloves, graphics tablets, joysticks, keyboards, mouse (mice), remote controls, retina readers, trackballs, trackpads, and/or the like.

Peripheral devices 912 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the ERMS controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the ERMS controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the ERMS controller and/or a computer systemization may employ various forms of memory 929. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 929 may include ROM 906, RAM 905, and a storage device 914. A storage device 914 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); ERMS threat index tagging component(s) 941; ERMS threat index retrieving component(s) 942; ERMS event analyzer component(s) 943; ERMS threat category determining component(s) 944; ERMS early warning component(s) 945; ERMS threat simulation/learning component(s) 946; the ERMS component(s) 935; and/or the like (i.e., collectively a component collection). These components may be stored and accessed from the storage devices and/or from storage devices accessible through an interface bus. Although non-conventional program components such as those in the component collection, typically, are stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the ERMS controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may facilitate the interaction with communications networks, data, I/O, peripheral devices, program components, memory, user input devices, and/or the like. The operating system may provide communications protocols that allow the ERMS controller to communicate with other entities through a communications network 913. Various communication protocols may be used by the ERMS controller as a subcarrier transport mechanism for interaction, such as, but not limited to: multicast, TCP/IP, UDP, unicast, and/or the like.

Information Server

An information server component 916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the ERMS controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the ERMS database 919, operating systems, other program components, user interfaces, Web browsers, and/or the like.

Access to the ERMS database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the ERMS. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the ERMS as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the ERMS enabled nodes. The combined application may be nugatory on systems employing standard Web browsers.

Mail Server

A mail server component 921 is a stored program component that is executed by a CPU 903. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support. communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the ERMS.

Access to the ERMS mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a conventional mail viewing application is such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 927, cryptographic processor device 928, and/or the like. Cryptographic processor interfaces may allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component may facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the ERMS may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to allow the ERMS component to engage in secure transactions if so desired. The cryptographic component facilitates the secure accessing of resources on the ERMS and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The ERMS Database

The ERMS database component 919 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the ERMS database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the ERMS database is implemented as a data-structure, the use of the ERMS database 919 may be integrated into another component such as the ERMS component 935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 919 includes several tables 919a-e. A Threat Specification Information table 919a includes fields such as, but not limited to: include sensor_ID, sensor_type, sensor_location, and/or the like. The Threat Specification table may support and/or track multiple threat monitoring sensors utilized on an ERMS. An Infrastructure & Sensor Characteristic Information table 919b includes fields such as, but not limited to: building_infrastructure_floor_plan, schematic_plan, normalized_sensor_value, sensor_reading, sensor_reading_range, sensor_operating_range, sensor_operating_tolerance, sensor_statistic_mean_value, sensor_statistic_standard_deviation_value, sensor_statistic_upper_cutoff_limit, sensor_statistic_lower_cutoff_limit, and/or the like. A Policy/Legal table 919c includes fields such as, but not limited to: a site_camera_usage_privacy_policy, site_privacy_regulation_protocol, site_safety_policy, site_occupancy_regulation_protocol, and/or the like. A Feedback Report & Intervention table 919d includes fields such as, but not limited to: safety_personnel_ID, safety_personnel_report_ID, safety_personnel_overide_input_ID, safety_personnel_overide_input_description, safety_personnel_overide_input_value, and/or the like. A Data Structure table 919*e* includes fields such as, but not limited to: sensor_numerical_ID, sensor_output_reading_NUMERICAL_COMP, sensor_output_reading_range_NUMERICAL_COMP, sensor_numerical_identifier_value_NUMERICAL_COMP, sensor_weighting_factor_TEXTUAL_COMP, sensor_math_type_TEXTUAL_COMP, sensor_ math_operator_TEXTUAL_COMP, sensor_statistic_mean_value_TEXTUAL_COMP, sensor_statistic_standard_ deviation_value_TEXTUAL_COMP, sensor_statistic_range_upper_cutoff_limit_TEXTUAL_COMP, sensor_statistic_range_lower_cutoff_limit_TEXTUAL_COMP, sensor_maufacturer_TEXTUAL_COMP, infrastructure_numerical_ID, infrastructure_numerical_portion_NUMERICAL_COMP, infrastructure_specification_TEXTUAL_COMP, infrastructure_sensor_ID_value_TEXTUAL_COMP, and/or the like. In one embodiment, the ERMS database may interact with other database systems. For example, employing a distributed database system, queries and data access by search ERMS component may treat the combination of the ERMS database, an integrated data security layer database as a single database entity.

In one embodiment, user programs may contain various user interface primitives, which may serve to update the ERMS. Also, various accounts may require custom database tables depending upon the environments and the types of clients the ERMS may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919*a-g*. The ERMS may be configured to keep track of various settings, inputs, and parameters via database controllers.

The ERMS database may communicate to and/or with other components in a component collection, including itself, and/or facilities of the like. Most frequently, the ERMS database communicates with the ERMS component, other program components, and/or the like. The database may contain, retain, and provide information regarding other nodes and data.

The ERMSs

The ERMS component 935 is a stored program component that is executed by a CPU. In one embodiment, the ERMS component incorporates any and/or all combinations of the aspects of the ERMS that was discussed in the previous figures. As such, the ERMS affects accessing, obtaining and the provision of information, services, transactions, and/or the like across various communications networks.

The ERMS component transforms merchant promotional offer inputs, user or consumer-sent information (e.g., purchase receipt data), and individual user or consumer transaction inputs via a ERMS retrievable account information component, a ERMS purchase information transfer component, and a ERMS purchase activity process component into offer data, transaction authorization requests, retrieved transaction data, retrieved offer information, retrieved user account information, sent user account information, and targeted offer (e.g., promotions) outputs that are distributed to individual user or consumers.

The ERMS component providing access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the ERMS server employs a cryptographic server to encrypt and decrypt communications. The ERMS component may communicate to and/or with other components in a component collection, including itself, and/or facilities of the like. Most frequently, the ERMS component communicates with the ERMS database, operating systems, other program components, and/or the like. The ERMS may contain, communicate, generate, obtain, and/or provide program component, system, user, and/or data communications, requests, and/or responses.

Distributed ERMSs

The structure and/or operation of any of the ERMS node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the ERMS controller may depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse (e.g., communications) data. Further, the parsing grammar may be used beyond message parsing, but may also be used to parse: databases, data collections, data stores, structured data, and/or the like. Again, the desired configuration may depend upon the context, environment, and requirements of system deployment.

For example, in some implementations, the ERMS controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Additional Principles & Embodiments

The following provides, among other things, further examples of mathematical treatment, principles, and embodiments, as they may relate to the ERMS. In the following, the term LIVEDESIGN may refer to one or more aspects of the ERMS.

Live Design Markup Language

LiveDesign Markup Language, at the core of LiveDesign, is a flexible and highly expressive XML application to represent data and assertions from multiple domains (such as legal and engineering) in a uniform and coherent format. One key requirement may be that it be entirely machine-understandable via a high level of semantic markup to provide the context information necessary to perform automatic computations, both in the numerical and in the symbolic realm in a fully automatic mode. In the presence of incomplete and partial subjective information fuzzy logic based computing with words, in addition to converting subjective information/opinions into numbers, facilitates user-controlled activities including conformance checks and certification. The system documents all critical conditions by exhibiting a suitable certificate or witness. From the decision standpoint all final outcomes of probabilistic, Bayesian and soft computing elements may classify threats into safety and security alerts, vide, FIG. 10, by using the stored knowledge captured with the LiveDesign a Markup Language, to broadcast at local and national levels.

Deterministic Computation

Standard computer program libraries to solve algebraic and differential equations may be used to provide support to building game theory, combinatorics and graphics applications.

Numerical and Symbolic Computations

Figure 10:
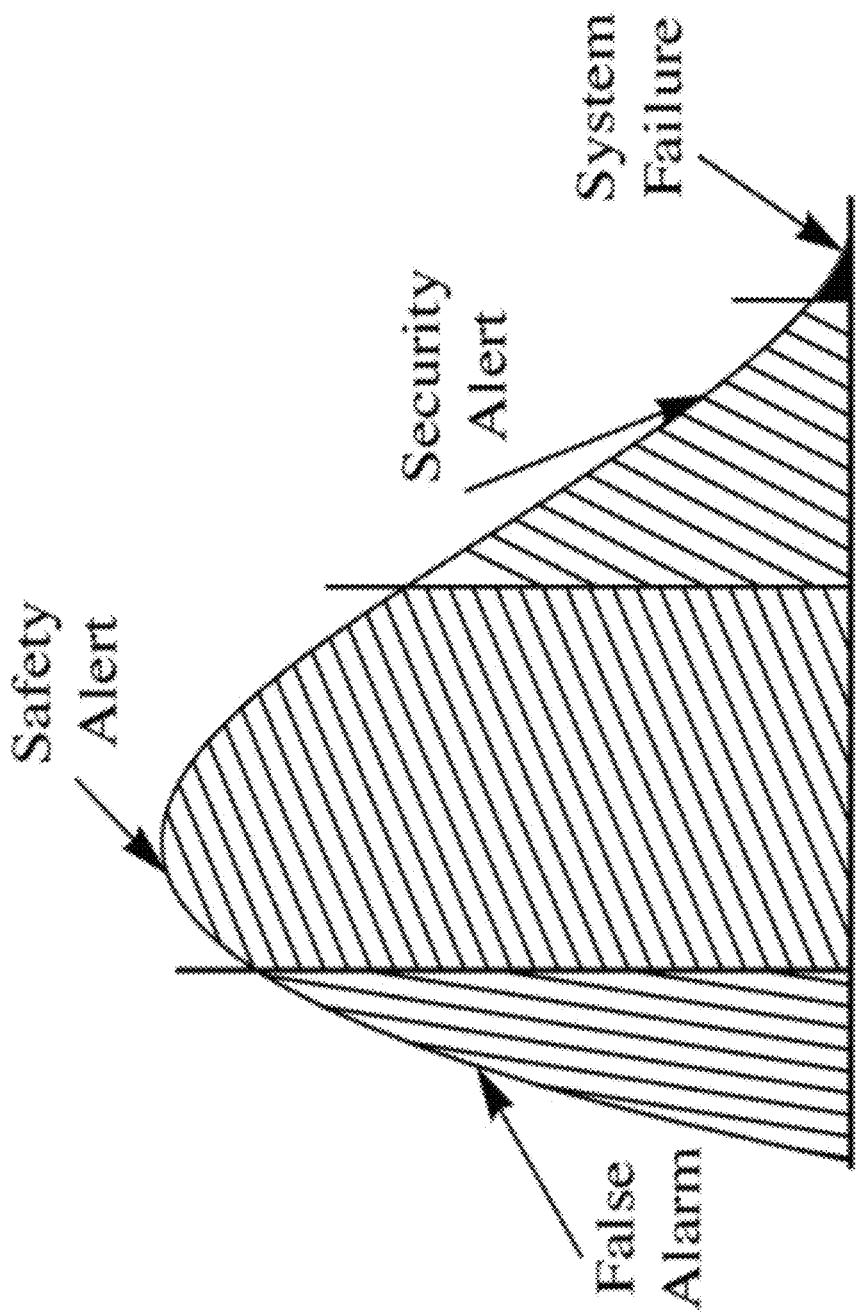
FIG. 10 is an example threat probability density function according to some embodiments of the ERMS.

The two parts are Probabilistic Numerical Computation and Probabilistic Symbolic Computation. The later uses computer algebra for exact representation without approximation of mathematical expressions for probability distributions and their functions. For example, $\beta$-distributions may be chosen to depict probability density functions, as shown in FIG. 10, where the lower and upper limits, like a, b in FIG. 12, along with mean $\mu$ and standard deviation $\sigma$ may uniquely define all higher statistical moments in closed-forms.

Calculations Using Fuzzy Logic, Game Theory and Bayesian Updating

Symbolic algebraic and numerical arithmetical calculations may be used in tandem in Fuzzy Logic conversions between subjective and objective information including type-2 fuzziness. Game Theory and Bayesian Updating modules may employ the unified symbolic-numeric environment in parallel computing modes as well.

Schematic of Conceptual Modules and Data Flow

Figure 11:
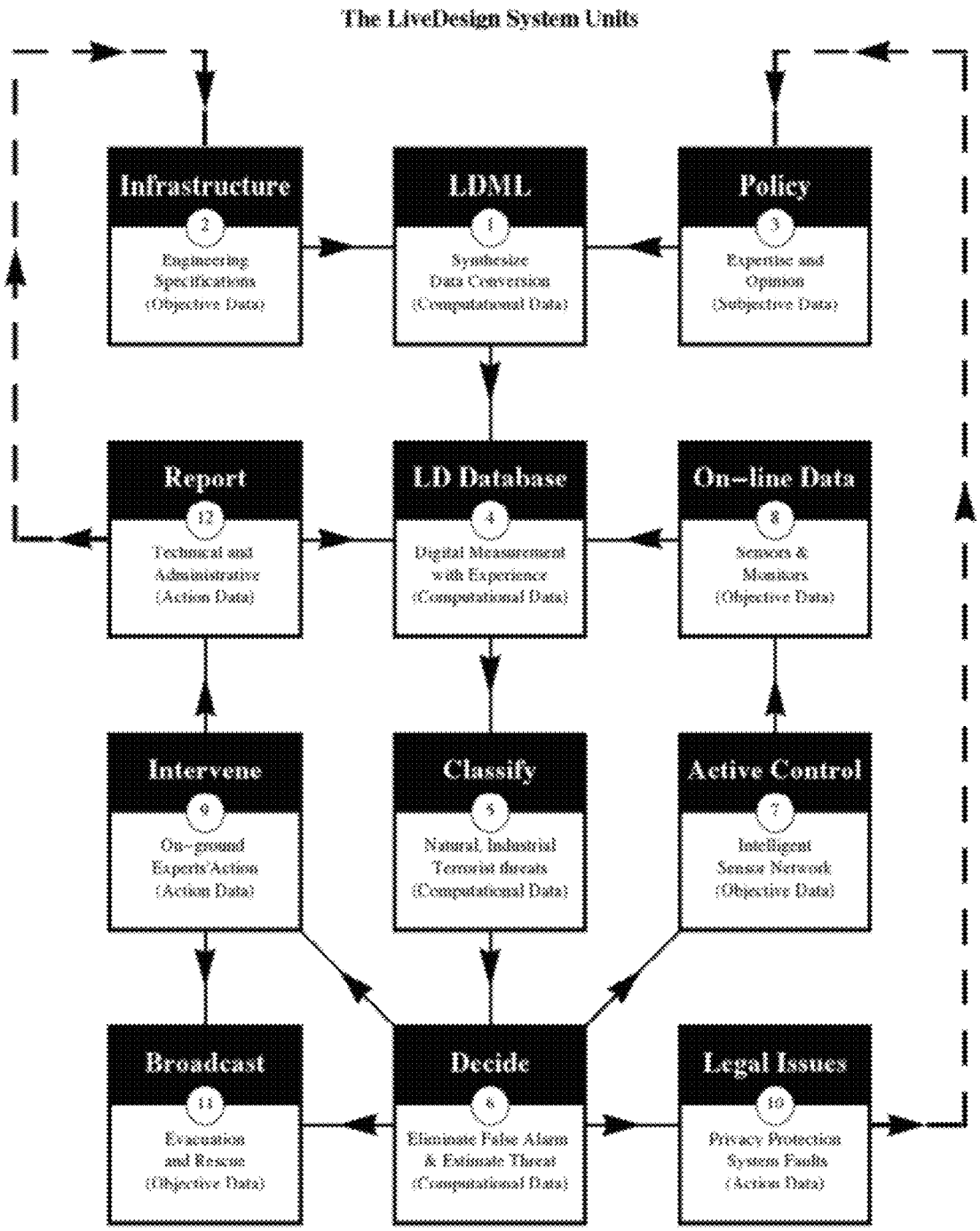
FIG. 11 is an alternative example of functional modules according to some embodiments of the ERMS.

There are the following three aspects of integrating objective, subjective, computational, and action data (e.g., see heading below), in LiveDesign. FIG. 11 schematically shows the modules: (i) preparation for mitigation: modules 1, 2 and 3; (ii) human intervention: modules 9 and 10; and (iii) automatic cycles: modules 4, 5, 6, 7, 8, (intelligent sensor network) 11 and 12.

Some Applications (Based on FIG. 11)

Stampedes in Large Gatherings

For example, the fuzzy logic unit may work more in a situation like stampede in a sports arena where the intensity of danger could be more than what is observed during normal traffic accident, fire in an apartment etc. but less than the highway traffic jam after Katrina. The fuzzy logic unit in those cases will be designed to assign a fraction (membership function) that may indicate the extent the local management may be inadequate.

Mass Transit and Transportation Accidents

An example could be an accident in a railway track where the evacuation from a platform or the region surrounding the accident site may require much more vigorous second by second updating of the emergency management strategy. The Bayesian logic unit may dominate to updating all uncertain information in that LiveDesign Data Base.

Housing for Senior Citizens

On-Site/on-Line Health Care

For example, a fall can be detected by a sensing camera-microphone system. LiveDesign may broadcast the accident to the medical unit along with the medical record. This may help determine, for example, whether the fall could have been due to a heart attack or a slip at a crumpled rug. The LiveDesign Data Base may have personal medical data which may be matched with apprehended health conditions for that particular person. Whether to summon a paramedic or a heart specialist may be suggested by the LiveDesign hardware-software system thereby shortening the arrival time of help.

Evolving Physical Description during Constructions

When a bridge, building or a ship is being constructed the local emergency management authority does not possess an up-to-date picture of the on-going construction. So at a disaster the final finished facility from engineering drawings do not help the first responders. Following the direct input from construction schedules, and from video and other monitors, the LiveDesign Data Base may reconstruct an exact 3-d picture of the current state of the building, bridge, ship, as the case may be. These graphics and texts can be transmitted to the emergency management authority as well as to the people in danger in the premises.

Cyber-secured Diagnostics for the Energy Grid

With the LiveDesign hardware-software active system safe functioning of the energy distribution system may be monitored. Any malfunction or deliberate attack can be identified in real-time. Self-powered intelligent sensor network may send codes to the command-post where LiveDesign Data Base may decipher codes to text and graphics.

Text and Image Transmission to First Responders

The fast arriving 3-d images to the first responders as they travel from the command-post to the endangered site prepare them to take immediate actions upon arrival. These dedicated, highly secured, communication streams may be transmitted globally with almost no power consumption at the disaster location. It may then be possible to instruct the habitants from the command post how to minimize personal injuries, for example.

Medical Image and Video Stream Transmission

Medical images have a special property that the graphics depict well-defined anatomical features. An ordinary OCR optical character recognition program does not have the geometrical structure that adheres to the biology of the anatomical object described in the transmission data. A LiveDesign Data Base can be written for a human liver, for example, if the CAT Scan of the liver is transmitted; similarly a lung tagging may facilitate the transfer of lung scans. These LiveDesign Feature Extractors help extract and transmit the feature data as: (feature $-i$, value$_i$); feature: a biological term. Specialists in anatomy/geometry of the particular anatomical element may furnish the subjective information that are typically stored in module number 3 in FIG. 11. For a video transmission the same compression algorithm may be applied for each frame.

Unusual Traffic Patterns

Automobile traffic tie ups, abnormal movement and the loss of balance of a patient just before a collapse, unauthorized downloading volumes of commercial proprietary and government sensitive data, for example, follow very similar time signatures that may be detected with different special purpose LiveDesign Data Base.

Financial Engineering

Extreme Statistics implemented within the fuzzy logic computation may signal impending industrial collapses based on past knowledge of experts and on-line activities of policy makers. Bayesian calculations may indicate crisis that may be dynamically mitigated.

Different Types of Data

The Objective Data comprises of: (1) Engineering Specifications, module number 2; (2) Digital Data stream coming out of sensors and monitors, module number 7; (3) Time dependent instructions to the sensors and monitors focusing what to look for, module number 8; and (4) Digital Data stream coming out of the broadcast mechanisms to warn the human users how to take safety steps, as broadcast with module number 11. The textual parts may be written for LiveDesign Data Base. The Graphics may be stores as encapsulated postscript files, .eps. (5) A Subjective Data may be in Module number 3 written as a fuzzy logic element that may be associated with a membership function. Experiences of emergency management authority play a significant role in mitigating any out-of-the-ordinary situation. On the same issue experts may have different opinions. Some experts may have more credibility on certain aspects. All these inexact characterizations may be digitized using fuzzy logic constructs. Since an opinion may be different from all correct or all wrong, fuzzy logic representation of partial truth for everything, which may have two different answers, may be encapsulated within a subjective dataset.

Computational Data

As the emergency related information may be streaming into the LiveDesign Management system, the subjective and objective data may be utilized side by side resulting in computational data that flows through the LiveDesign computational cycles. The modules that perform computational tasks may: (6) organize all objective and subjective data under one electronic digital file, module number 1; (7) continuously update, in real-time, the current information, and write the information in LiveDesign Markup Language in LiveDesign Data Base designated by module number 4; (8) classify data for more effective mitigation according to natural, man-made or industrial disaster in module number 5; and (9) eliminate false alarm and program the smart sensor network to focus attention on a certain type of data, such as a chemical content in the air over the temperature distribution in module number 6; (10) report a system failure via modules 10 and 12.

Action Data

Action Data interprets outcomes of running a LiveDesign system in natural languages. The necessary tasks may be: (11) to furnish optimal mitigation suggestions to emergency management authority, module number 9; (12) to compile a report on the effectiveness of executing the LiveDesign computer program, module number 12; and (13) to detect an inconsistency in policy issues within module number 10 in FIG. 11.

Intelligent Sensor Network: Elimination of False Alarm

Figure 12:
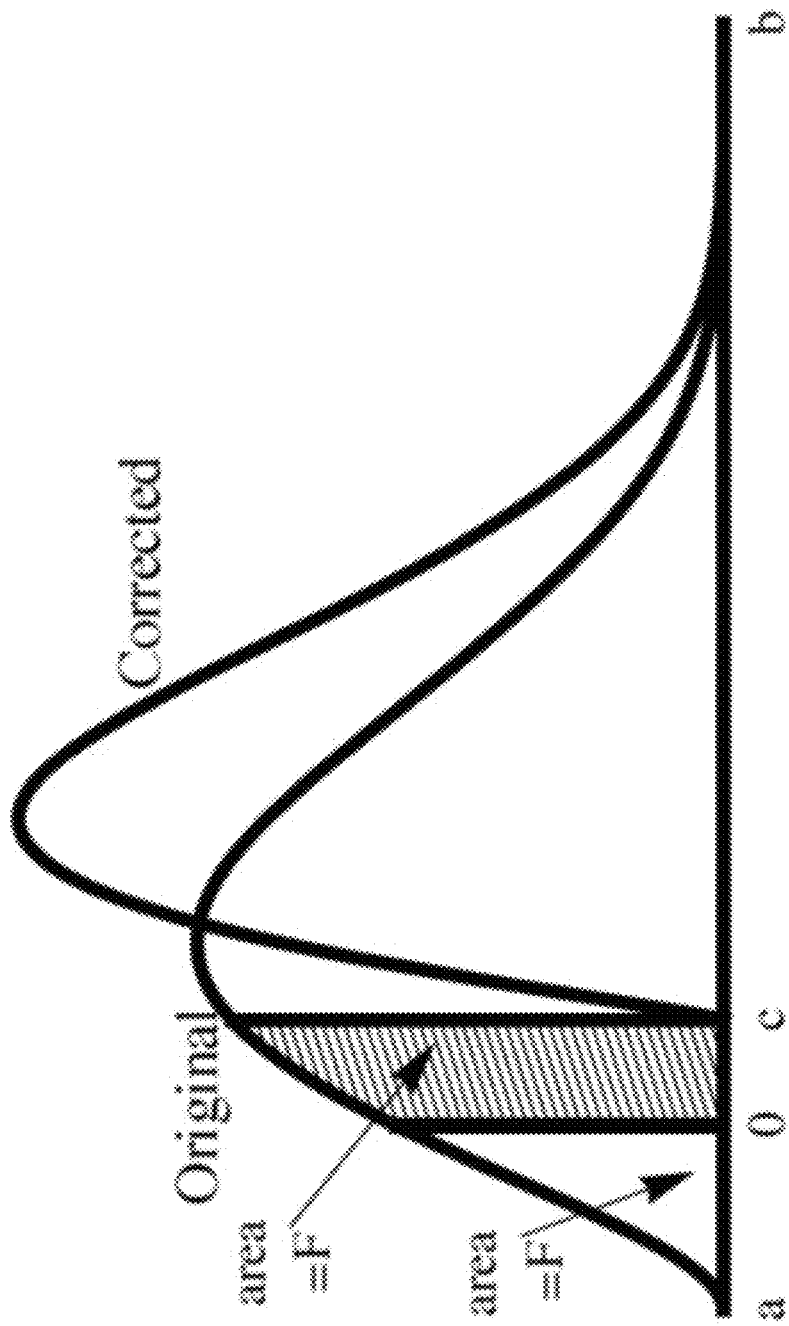
FIG. 12 is an example $\beta$-distribution according to some embodiments of the ERMS.
Figure 13:
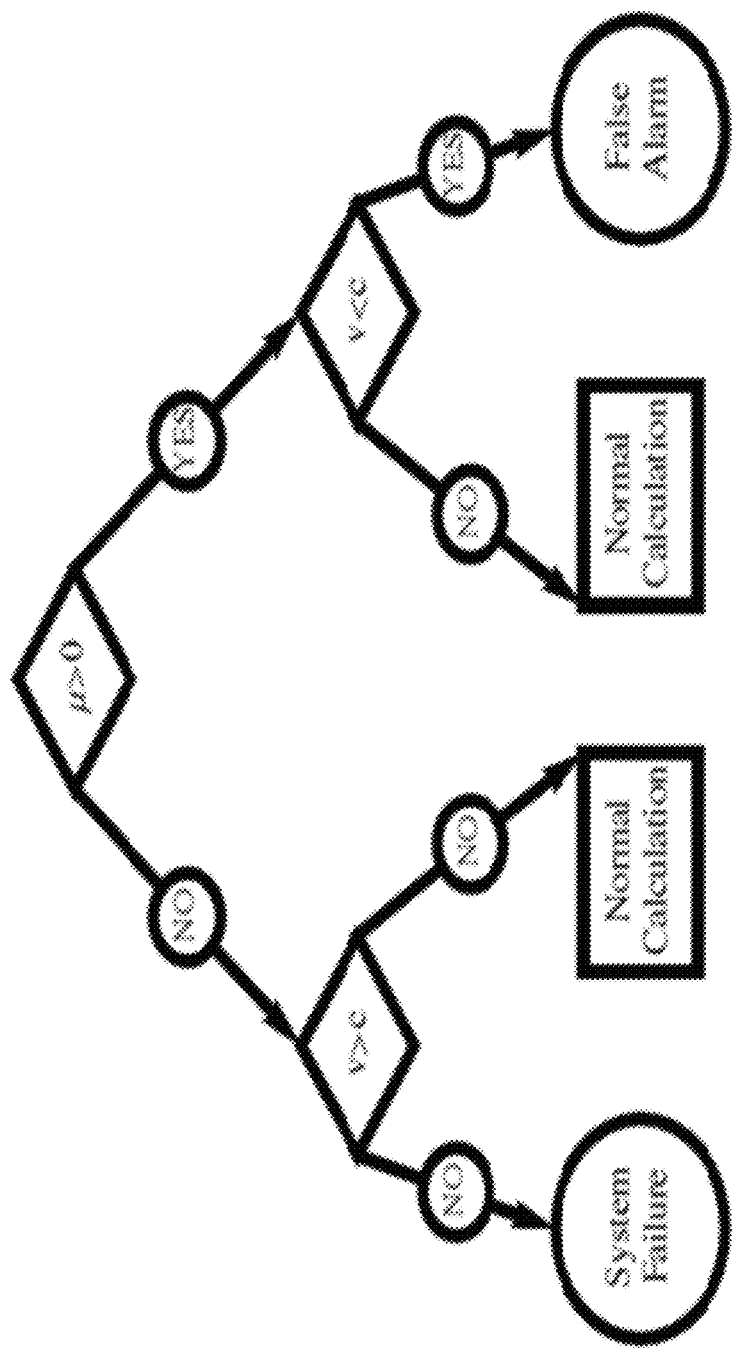
FIG. 13 is an operational flow diagram illustrating one aspect of a false alarm and system failure process in some embodiments of the ERMS.

Conventional sensor monitor systems may output a large volume of data at a very high time rate. The intelligent sensor network is the mechanism to extract only the small subset of useful data associated with the context of the particular emergency. Working in tandem, modules 4, 5, 7, 8, 9 and 12 in FIG. 11 perform the necessary actions. Individual sensor and monitor may send the raw data to a local computer system that is amenable to LiveDesign. All the inputs from different sensors and monitors are synthesized. The input are filtered according to fuzzy logic specification from the active control module number 7 in FIG. 11, therein modules 2, 12 and 10, 3 are calibrated as Early Warning Systems. With each arithmetic calculation the level of uncertainty accumulates. In common calculation procedures these errors may overwhelm computing resources and results may become highly error-prone hence unusable. Filtering each result of an arithmetic operation the level of uncertainty is kept under control. This ensures high degree of reliability of LiveDesign computations. In Interval arithmetic calculations, where the mean and standard deviation of data are related to the interval, accumulation of errors may cause false alarm. This may be a reason why emergency management authorities tend to decide most mitigation measures using their subjective judgment. This shortcoming of conventional procedures may be circumvented using a special algorithm, as illustrated in FIG. 12. The main task of elimination of false alarms is carried out in module number 6. The filter based on a prescribed arithmetic tolerance may be constructed here. In addition to screening out false alarms, module number 6 may send a fuzzy control algorithm, whose parameters may be based on the eliminated false alarms, to module number 7. Operations may be carried out at the hardware level to accelerate the false alarm elimination.

Early Warning System

The LiveDesign management system may be triggered only when some intervention from the local or higher civic authorities may be necessary. Based on experiences Early Warning Systems may be designed for future use. The calibration may address all types of emergencies addressed under module number 5. So for most of the time the LiveDesign emergency management system may not process real-world on-line data. During this so called idle time the system may numerically simulate scenarios of possible emergency situations as appropriate to mitigate natural, man-made, industrial and other disasters. The emergency management authorities may be informed of such so called yet-to-apprehended events. Mathematical formulations based on optimization theory may provide models for simulations. Coupled with exhaustive searches and information propagation, it may be possible to discover the shortcomings in the present management strategies. Improvements in future design and briefing the lawmakers on such possible threats, are additional benefits for implementing an Early Warning System in conjunction LiveDesign. Experiences are encapsulated within the knowledge base written in the LiveDesign Markup Language. The technical deficiencies that amplified the negative impact are stored in the module number 2. Any legal and or privacy issues that caused the emergency or hampered better mitigation is resolved via experts' action and are stored within the future Policy module number 3. To what extent the system deficiencies may amplify future disaster may be evaluated on the basis of the information in module number 12 and 2. The same physical installation as intelligent sensor network functions under all types, natural, terrorist, industrial and all other calamities.

LiveDesign Circumvents Division by Zero: Detects False Alarm and System Failure

A generic variable z in the LiveDesignDatabase has a quantitative (numbers) part and a qualitative (textual description) part to assign weights for numeric values:

z: {number$_z$, text$_z$}; number$_z$: {v$_z$, a$_z$, b$_z$, μ$_z$, σ$_z$}; text$_z$: fuzzy logic data v: value; a: lowest limit; b: highest limit; μ: mean; σ: standard deviation text$_z$: words defined in LiveDesign Markup Language dictionary to assign weights to v, a, b, μ, σ to yield weighted values for a in arithmetic operations.

Here a frequency function for an uncertain (random variable) will be denoted by $f$ and the associated cumulative distribution function will be denoted by $\wp$:

$$\wp(x) = \int_{-\infty}^{x} f(x)\,dx = \int_{a_x}^{x} f(x)\,dx;$$

β-function, an example:

$$f(x) = \beta\left(\frac{x - a_x}{b_x - a_x}\right)$$

Inverse value when the Interval[ā, b̄] does not Contain Zero $$\frac{1}{z} = \left\{\left\{\frac{1}{\bar{v}}, \frac{1}{\bar{b}}, \frac{1}{\bar{a}}, \text{Inverse}[\bar{\mu}], \text{Inverse}[\bar{\sigma}]\right\}, \{\text{descriptior for} - z\}\right\}$$

Experts recommend an acceptable distribution function $f$, e.g. the β-distribution, to calculate Inverse[$\bar{\mu}$], Inverse[$\bar{\sigma}$]:

$$\text{Inverse}[\bar{\mu}] = \int_{a_x}^{b_x} \frac{f(x)}{x} dx;$$

$$\text{Inverse}[\bar{\sigma}] = \sqrt{\int_{a_x}^{b_x} f(x)\left(\frac{1}{x} - \text{Inverse}[\bar{\mu}]\right)^2 dx}$$

When the Interval[ā, b̄] contains Zero: an example β-distribution

Physically, this situation arises due to accumulation of errors due to computations and/or imperfection in experts' opinion to assign weights to z to yield z̄. For the standard form of β-function, when the variable $$0 < x^* = \frac{x - a}{b - a} < 1:$$

$$0 < x^* = \frac{x - a}{b - a} < 1; \mu^* = \frac{\mu - a}{b - a};$$

$$\sigma^* = \frac{\sigma}{b - a}; f(x^*) = \frac{(x^*)^{m-1}(1 - x^*)^{n-1}}{\beta(m, n)}$$

$$\mu^* = \frac{m}{m + n}; \sigma^* = \sqrt{\frac{mn}{(1 + m + n)(m + n)^2}};$$

$$m = \frac{-\mu^{*3} + \mu^{*2} - \mu^* \sigma^{*2}}{\sigma^{*2}}; n = \frac{(\mu^* - 1)(\mu^{*2} - \mu^* + \sigma^{*2})}{\sigma^{*2}}$$

An example is shown in FIG. 12 when the mean μ>0.

FIG. 12 The mean and standard deviation are preserved during correction

In FIG. 12 the hatched portion has the same area as that under the β-distribution $f(x)$ between the lower limit a and 0. Let the value of this area be F, then:

$$F = \int_a^0 f(x) dx;$$

selected value of c is such that:

$$\int_a^c f(x) dx = 2F$$

The area under $f(x)$ between 0 and c is hatched. The corrected β-function is between c and the upper limit b, and its mean μ and standard deviation σ are the same as that of the original β-function. If v̄<c a false alarm is reported, and the reciprocal is returned as $$\frac{1}{c}. \text{ For } \mu < 0: F = 1 - \int_0^b f(x) dx;$$

then c will be such that $$\int_c^b f(x) dx = 2F.$$

This calculation may be used to detect the system failure if v̄>c.

Terrorism Detection

The Fréchet type of Extreme Value Distributions yields zero value (no danger) below a threshold. This may be a characteristic in terrorist attacks, milder attempts are dealt by Gaussian based Safety Measures, but the massive attack is perceived when a prescribed level of danger is exceeded. At a time $t_i$ the set of all sensor weighted readings be a list $\{R_i\}$. The assumed expert system optimization $f$ yields a single number $E_i = f(\{R_i\})$, The values $E_i$ are normalized and a generic value $E^*$ and $\wp(E^*) = T^*$, where the uncertainty calculation procedure $\wp$ provides a threat index $T_i^* = \wp(\{E_i^*\})$. An exponential (e) fit, for $\alpha > 0$, may suggest the following type disasters:

$$\text{terrorism: } T^* = \begin{cases} 0 & \text{if } E^* \leq 0 \\ e^{-E^{*-\alpha}} & \text{if } E^* > 0 \end{cases}$$

$$\text{industrial: } T^* = \begin{cases} e^{-(-E^*)^{\alpha}} & \text{if } E^* \leq 0 \\ 1 & \text{if } E^* > 0 \end{cases} \text{ and}$$

$$\text{natural: } T^* = e^{(-e)^{-E^*}}$$

Binary Operations $$x + y = \{\text{Interval}[a_x, b_x] + \text{Interval}[a_y, b_y], \mu_x + \mu_y, \sqrt{\sigma_x^2 + \sigma_y^2}\}$$

$$x \times y = \{\text{Interval}[a_x, b_x] \times \text{Interval}[a_y, b_y],$$

$$\mu_x \times \mu_y, \sqrt{\sigma_x^2 \times \sigma_y^2 + \mu_x^2 \times \sigma_y^2 + \mu_y^2 \times \sigma_x^2}\}$$

Figure 14:
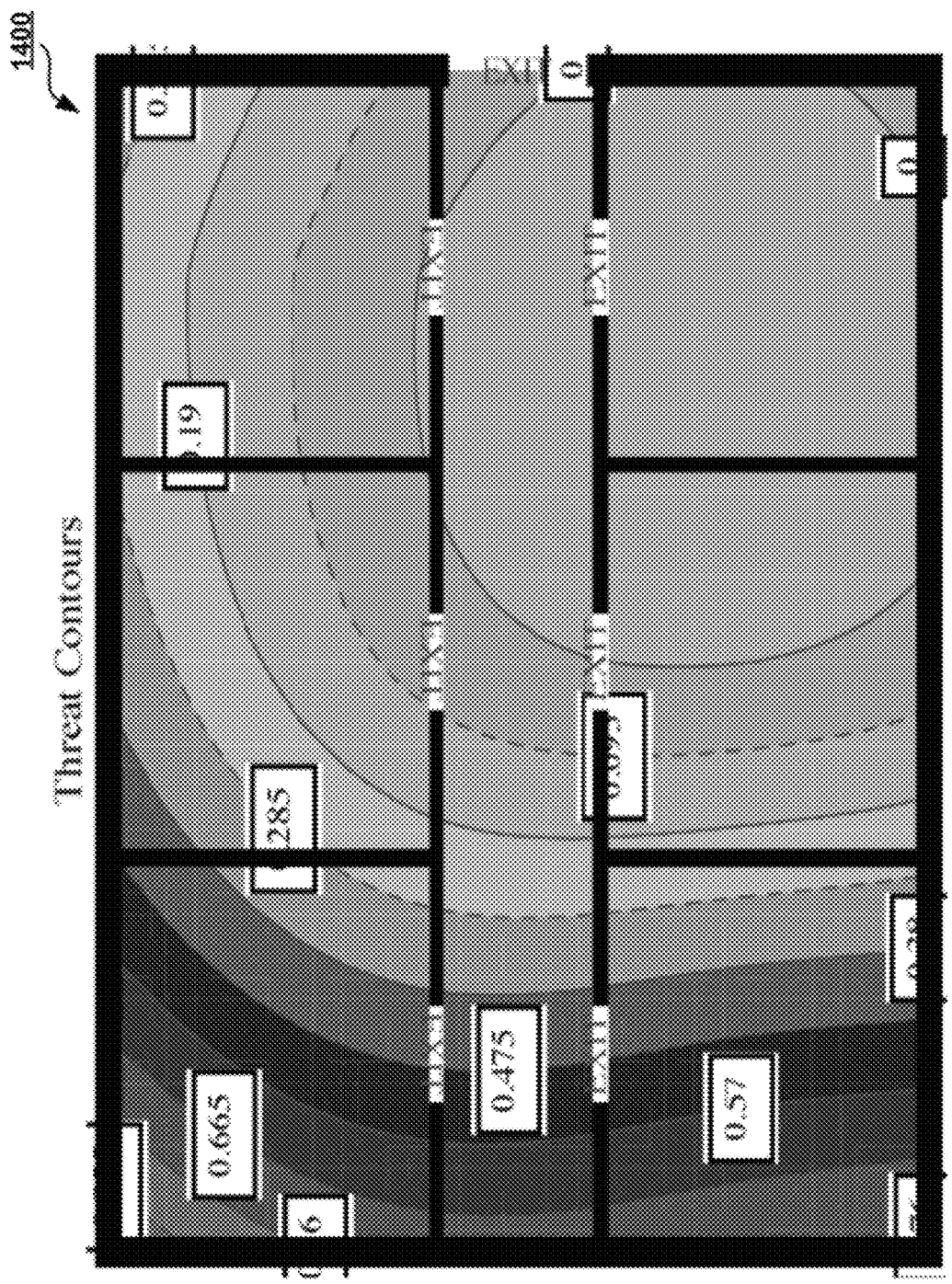
FIG. 14 is an example illustrating one aspect of a displayed threat contour in some embodiments of the ERMS.

As illustrated, FIG. 14 shows a flow chart process for detecting false alarms and system failures according to some implementation of the LiveDesign System.

In order to address various issues and improve over previous works, the application is directed to EMERGENCY RESPONSE MANAGEMENT APPARATUSES, METHODS AND SYSTEMS. The entirety of this application (including the Cover Page, Title, Headings, Field, Background, Summary, Brief Description of the Drawings, Detailed Description, Claims, Abstract, Figures, Appendices, and otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It may be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described a in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs and/or characteristics of a ERMS individual and/or enterprise user, database configuration and/or relational model, data type, data transmission and/or network framework, syntax structure, and/or the like, various embodiments of the ERMS, may be implemented that provide a great deal of flexibility and customization. For example, aspects of the ERMS may be adapted for detecting and managing emergency events across a variety of infrastructures that exist in a vast array of environments. While various embodiments and discussions of the ERMS have been directed to detecting emergency events, however, it is to be understood that the embodiments described herein may be readily configured and/or customized for a wide variety of other applications and/or implementations such as, for example, the detection of other events triggered by, for example, financial data (e.g., stock trends, futures, commodities, etc.) Embodiments may suitably comprise, consist of, or consist essentially of, various combinations of the disclosed elements, components, features, parts, steps, means, and/or the like.

What is claimed is:

1. A method executed by at least one processor of a computer system of an emergency management system, the processor-executed method comprising:
   receiving sensor readings in real time from at least one sensor device;
   generating risk factors for the at least one sensor device using weighted sensor indications associated with the received sensor readings and a sensor statistical distribution associated with the at least one sensor device;
   curve fitting the generated risk factors to a plurality of statistical distribution curves, wherein:
      each of the statistical distribution curves is a respective type of statistical distribution indicative of a respective threat category,
      the plurality of statistical distribution curves includes at least one statistical distribution curve of an extreme statistical distribution type and at least one statistical distribution curve of a non-extreme statistical distribution type, and
      the at least one statistical distribution curve of the extreme statistical distribution type comprises a Fréchet Distribution;
   determining a threat category as being one of the respective threat categories based on the generated risk factors providing a best fit with one of the plurality of statistical distribution curves, wherein:
      the threat category is determined as the respective threat category associated with the type of statistical distribution of the one of the plurality of statistical distribution curves providing the best fit with the generated risk factors,
      the threat category associated with a statistical distribution curve of an extreme statistical distribution type is different from the threat category associated with a statistical distribution curve of a non-extreme statistical distribution type, and
      providing the best fit with the one of the plurality of statistical distribution curves comprises a Fréchet Distribution capable of best fitting the generated risk factors, the Fréchet Distribution representing a terrorist threat category;
   communicating information concerning the determined threat category to a user of the emergency management system for managing the threat based on the determined threat category; and
   adjusting the risk factors based upon receiving a validation of the determined threat category.

2. The method of claim 1, wherein the one of the plurality of statistical distribution curves comprises a Gumbel Distribution.

3. The method of claim 1, wherein the one of the plurality of statistical distribution curves comprises a Weibull Distribution.

4. The method of claim 1, wherein providing the best fit with the one of the plurality of statistical distribution curves comprises a Gumbel Distribution best fitting the generated risk factors, the Gumbel Distribution representing a natural disaster threat category.

5. The method of claim 1, wherein providing the best fit with the one of the plurality of statistical distribution curves comprises a Weibull Distribution best fitting the generated risk factors, the Weibull Distribution representing an industrial disaster threat category.

6. The method of claim 1, wherein providing the best fit with the one of the plurality of statistical distribution curves comprises a non-extreme distribution best fitting the generated risk factors, the non-extreme distribution representing a safety alert category.

7. The method of claim 1, wherein a non-extreme distribution representing a safety alert category comprises a Gaussian Distribution.

8. The method of claim 1, wherein the sensor statistical distribution associated with the at least one sensor device is a Beta distribution curve.

9. The method of claim 1, wherein the at least one sensor device comprises an intelligent sensor that is programmable to receive configuration information.

10. The method of claim 9, wherein the received configuration information comprise operation range information.

11. The method of claim 1, wherein the at least one sensor device comprises a plurality of sensor devices for detecting respective conditions associated with an environment.

12. The method of claim 1, further comprising:
retrieving, based on each of the sensor readings, tagged information corresponding to the at least one sensor device, wherein the tagged information include numerical components and textual components.

13. The method of claim 12, further comprising:
providing weighting factors from the textual components of the tagged information;
providing numerical values from the numerical components of the tagged information, the numerical values each being representative of at least one sensor reading from the received sensor readings; and
applying the weighted factors to the numerical components for generating the weighted sensor indications.

14. The method of claim 13, wherein the weighted sensor indications comprise a normalized fraction value ranging between 0-1.

15. The method of claim 12, wherein the textual components of the tagged information comprise at least one of (i) an upper and lower cut-off range for the at least one sensor, (ii) a mean and a standard deviation for the at least one sensor over the upper and the lower cut-off range, (iii) a manufacturer reliability factor for the at least one sensor, and (iv) mathematical operations for utilizing the at least one sensor with at least one other sensor device.

16. The method of claim 15, wherein the sensor statistical distribution associated with the at least one sensor device is generated based on the mean and the standard deviation for the at least one sensor over the upper and the lower cut-off range.

17. The method of claim 1, further comprising:
receiving sensor readings from at least one other sensor device, the at least one other sensor device having an other statistical distribution that is combined with the statistical distribution of the at least one sensor device using interval mathematics.

18. The method of claim 1, wherein each of the risk factors are determined by calculating an area under the sensor statistical distribution, the area determined between each of the weighted sensor indications and a lower operating cut-off associated with the at least one sensor device.

19. The method of claim 1, wherein determining the threat category comprises providing each of the generated risk factors for generating the best fit with the one of the plurality of statistical distribution curves when each of the generated risk factors falls within a security risk region of the sensor statistical distribution.

20. The method of claim 1, further comprising:
adjusting, by a human operator, a current value corresponding to at least one of the weighted sensor indications to a new value corresponding to at least one new sensor indication;
determining, by the human operator, a new threat category based on the adjusted new value; and
replacing the current value with the new value when the new threat category is determined by the human operator to conform with a predetermined threat category expected by the human operator based on the new value.

21. The method according to claim 1, wherein the weighted sensor indications are based on a weight representing subjective text-based user input.

22. An emergency management processor-implemented method, comprising:
receiving sensor readings from at least one sensor device;
generating risk factors for the at least one sensor device;
curve fitting the generated risk factors to a plurality of statistical distribution curves including both non-extreme and extreme types of statistical distributions, wherein:
each of the plurality of statistical distribution curves is a respective type of statistical distribution indicative of a respective threat category,
the threat category associated with a statistical distribution curve of an extreme statistical distribution type is different from the threat category associated with a statistical distribution curve of a non-extreme statistical distribution type, and
the at least one statistical distribution curve of the extreme statistical distribution type comprises a Fréchet Distribution;
determining a threat category as being one of the respective threat categories based on the generated risk factors providing a best fit with one of the plurality of statistical distribution curves, wherein:
the threat category is determined as the respective threat category associated with the type of statistical distribution of the one of the plurality of statistical distribution curves providing the best fit with the generated risk factors, and
providing the best fit with the one of the plurality of statistical distribution curves comprises a Fréchet Distribution capable of best fitting the generated risk factors, the Fréchet Distribution representing a terrorist threat category;
communicating information concerning the determined threat category to a user of the emergency management system for managing the threat based on the determined threat category; and
adjusting the risk factors based upon receiving a validation of the determined threat category.

23. The method of claim 22, wherein the non-extreme and extreme statistical distributions comprise a Gumbel Distribution, a Weibull Distribution, the Fréchet Distribution, and a Gaussian Distribution.

24. The method of claim 22, further comprising:
generating other risk factors for an infrastructure that is associated with the at least one sensor.

25. The method of claim 22, wherein the generated risk factors and the generated other risk factors are selectively adjustable by a human expert via the at least one sensor device for use in future determinations of the threat category.

26. An emergency management system, comprising:
a memory; and
a processor disposed in communication with the memory and configured to issue processing instructions stored in the memory to:
receive sensor readings from at least one sensor device;
generate risk factors for the at least one sensor device using weighted sensor indications associated with the received sensor readings and a sensor statistical distribution associated with the at least one sensor device;

curve fit the generated risk factors to a plurality of statistical distribution curves, wherein:
    each of the statistical distribution curves is a respective type of statistical distribution indicative of a respective threat category,
    the plurality of statistical distribution curves includes at least one statistical distribution curve of an extreme statistical distribution type and at least one statistical distribution curve of a non-extreme statistical distribution type, and
    the at least one statistical distribution curve of the extreme statistical distribution type comprises a Fréchet Distribution;
determine a threat category as being one of the respective threat categories based on the generated risk factors providing a best fit with one of the plurality of statistical distribution curves, the threat category being determined as the respective threat category associated with the type of statistical distribution of the one of the plurality of statistical distribution curves providing the best fit with the generated risk factors, wherein:
    the threat category associated with a statistical distribution curve of an extreme statistical distribution type is different from the threat category associated with a statistical distribution curve of a non-extreme statistical distribution type,
    providing the best fit with the one of the plurality of statistical distribution curves comprises a Fréchet Distribution capable of best fitting the generated risk factors, and
    the Fréchet Distribution represents a terrorist threat category;
communicate information concerning the determined threat category to a user of the emergency management system for managing the threat based on the determined threat category; and
adjust the risk factors based upon a validation of the determined threat category.

27. At least one processor-readable tangible medium storing processor-issuable emergency management instructions that, when executed by at least one processor, cause one or more of the at least one processor to carry out steps comprising:

receiving sensor readings from at least one sensor device;
generating risk factors for the at least one sensor device using weighted sensor indications associated with the received sensor readings and a sensor statistical distribution associated with the at least one sensor device;
curve-fitting the generated risk factors to a plurality of statistical distribution curves, wherein:
    each of the statistical distribution curves is a respective type of statistical distribution indicative of a respective threat category,
    the plurality of statistical distribution curves includes at least one statistical distribution curve of an extreme statistical distribution type and at least one statistical distribution curve of a non-extreme statistical distribution type, and the at least one statistical distribution curve of the extreme statistical distribution type comprises a Fréchet Distribution;
determining a threat category as being one of the respective threat categories based on the generated risk factors providing a best fit with one of the plurality of statistical distribution curves, wherein:
    the threat category is determined as the respective threat category associated with the type of statistical distribution of the one of the plurality of statistical distribution curves providing the best fit with the generated risk factors,
    the threat category associated with a statistical distribution curve of an extreme statistical distribution type is different from the threat category associated with a statistical distribution curve of a non-extreme statistical distribution type,
    providing the best fit with the one of the plurality of statistical distribution curves comprises a Fréchet Distribution capable of best fitting the generated risk factors, and
    the Fréchet Distribution represents a terrorist threat category;
communicating information concerning the determined threat category to a user of the emergency management system for managing the threat based on the determined threat category; and
adjusting the risk factors based upon receiving a validation of the determined threat category.

* * * * *